(12) United States Patent
Arieli et al.

(10) Patent No.: US 8,319,975 B2
(45) Date of Patent: Nov. 27, 2012

(54) METHODS AND APPARATUS FOR WAVEFRONT MANIPULATIONS AND IMPROVED 3-D MEASUREMENTS

(75) Inventors: Yoel Arieli, Jerusalem (IL); Shay Wolfling, Tel Aviv (IL); Emmanuel Lanzmann, Tel Aviv (IL); Gavriel Feigin, Jerusalem (IL); Tal Kuzniz, Modiin (IL); Yoram Saban, Shoham (IL)

(73) Assignee: Nano-Or Technologies (Israel) Ltd., Lod (IL)

( * ) Notice: Subject to any disclaimer, the term of this patent is extended or adjusted under 35 U.S.C. 154(b) by 1172 days.

(21) Appl. No.: 10/592,544

(22) PCT Filed: Mar. 11, 2005

(86) PCT No.: PCT/IL2005/000285
§ 371 (c)(1),
(2), (4) Date: Jun. 4, 2009

(87) PCT Pub. No.: WO2005/086582
PCT Pub. Date: Sep. 22, 2005

(65) Prior Publication Data
US 2010/0002950 A1 Jan. 7, 2010

Related U.S. Application Data

(60) Provisional application No. 60/552,570, filed on Mar. 11, 2004.

(51) Int. Cl.
*G01B 11/02* (2006.01)
(52) U.S. Cl. .................................... 356/512
(58) Field of Classification Search .................. 356/512
See application file for complete search history.

(56) References Cited

U.S. PATENT DOCUMENTS
6,088,087 A * 7/2000 Graves et al. ............... 356/39
(Continued)

FOREIGN PATENT DOCUMENTS
WO  WO 01/77629 A2  10/2001
(Continued)

OTHER PUBLICATIONS

Measurement of the entropy of an image with application to image focusing, CH. Thum, OPTICA ACTA, 1984, vol. 31 No. 2, 203-211.*

*Primary Examiner* — Tarifur Chowdhury
*Assistant Examiner* — Jonathon Cook
(74) *Attorney, Agent, or Firm* — Leydig, Voit & Mayer, LLP

(57) ABSTRACT

Methods and apparatus to perform wavefront analysis, including phase and amplitude information, and 3D measurements in optical systems, and in particular those based on analyzing the output of an intermediate plane, such as an image plane, of an optical system. Measurement of surface topography in the presence of thin film coatings, or of the individual layers of a multilayered structure is described. Multi-wavelength analysis in combination with phase and amplitude mapping is utilized. Methods of improving phase and surface topography measurements by wavefront propagation and refocusing, using virtual wavefront propagation based on solutions of Maxwell's equations are described. Reduction of coherence noise in optical imaging systems is achieved by such phase manipulation methods, or by methods utilizing a combination of wideband and coherent sources. The methods are applied to Integrated Circuit inspection, to improve overlay measurement techniques, by improving contrast or by 3-D imaging, in single shot imaging.

22 Claims, 13 Drawing Sheets

U.S. PATENT DOCUMENTS

| | | |
|---|---|---|
| 6,552,808 B2 | 4/2003 | Millerd et al. |
| 6,819,435 B2 | 11/2004 | Arieli et al. |
| 6,839,469 B2 * | 1/2005 | Nguyen et al. ................ 382/255 |
| 7,445,335 B2 | 11/2008 | Su et al. |
| 7,815,310 B2 | 10/2010 | Su et al. |
| 8,100,530 B2 | 1/2012 | Zhou et al. |
| 8,118,429 B2 | 2/2012 | Raymond et al. |
| 8,162,480 B2 | 4/2012 | Zhao et al. |
| 2005/0089208 A1 * | 4/2005 | Dong et al. ................... 382/133 |

FOREIGN PATENT DOCUMENTS

WO    WO 03/062743 A1    7/2003

* cited by examiner

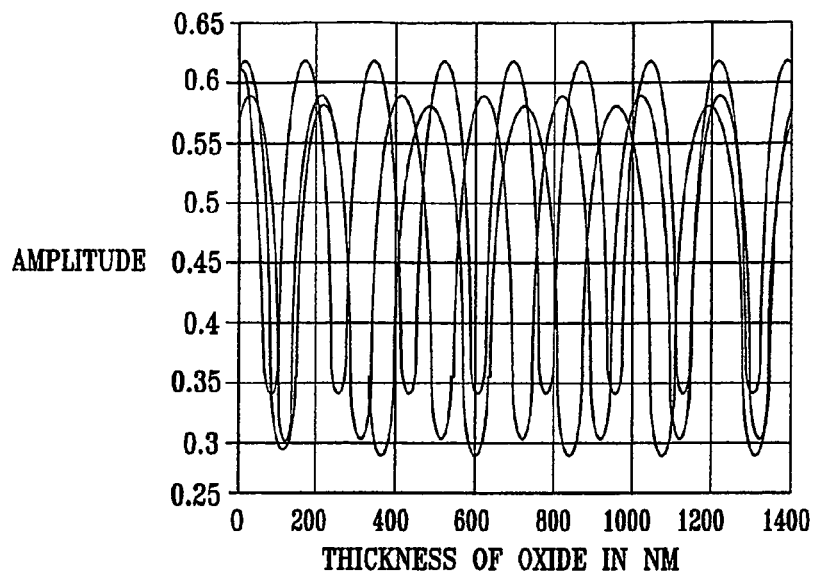
FIG. 7
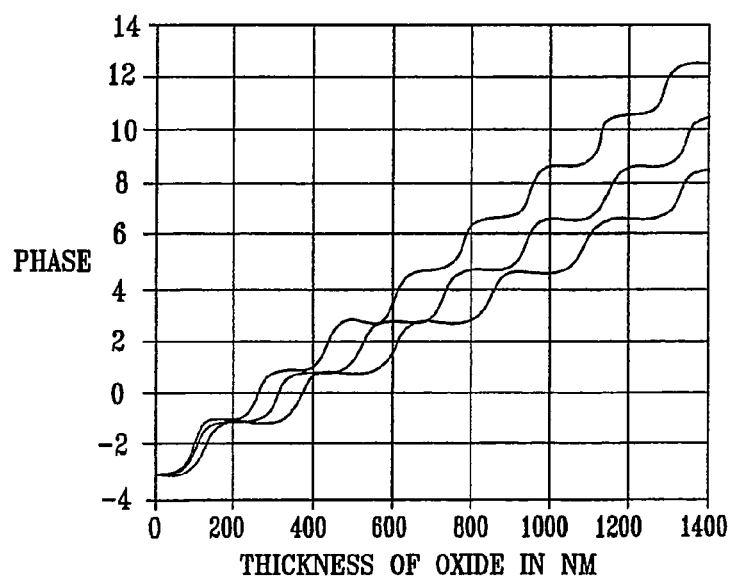

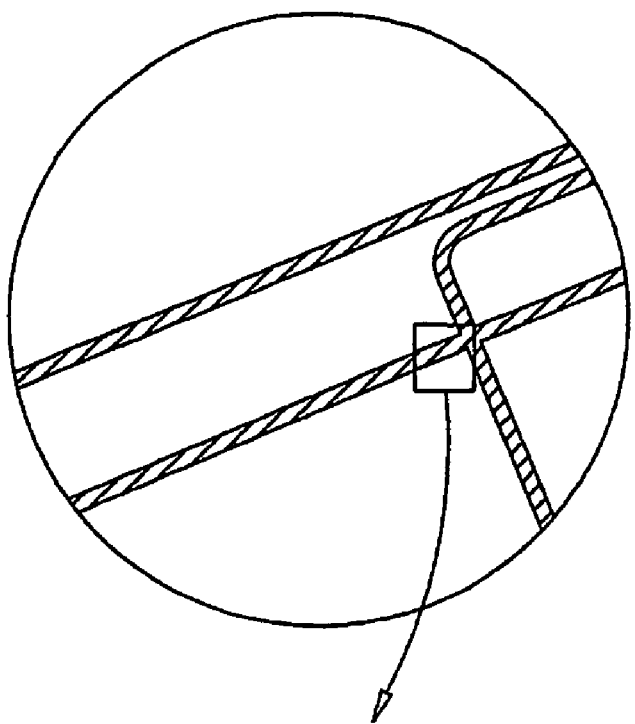
FIG. 19
FIG. 20
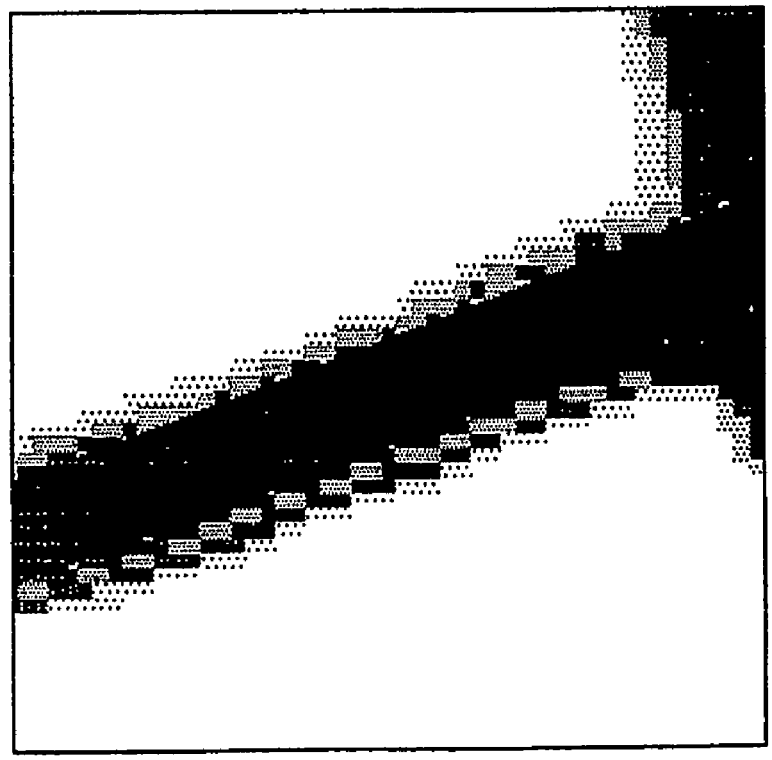

METHODS AND APPARATUS FOR WAVEFRONT MANIPULATIONS AND IMPROVED 3-D MEASUREMENTS

FIELD OF THE INVENTION

The present invention relates to the field of the use of complex optical wavefront measurements in metrologic applications, especially in the fields of the measurement of integrated circuits incorporating thin films, and in image processing applications.

BACKGROUND OF THE INVENTION

In co-pending and commonly assigned PCT Application No. PCT/IL/01/00335, published as WO 01/77629, U.S. Pat. No. 6,819,435, and PCT Application No. PCT/IL02/00833, published as WO 03/062743, all of which are incorporated herein by reference, each in its entirety, there are described methodologies and systems for wavefront analysis as well as for surface mapping, phase change analysis, spectral analysis, object inspection, stored data retrieval, three-dimensional imaging and other suitable applications utilizing wavefront analysis.

Some principles of these methods are described in FIGS. 1 and 2. FIG. 1 shows a simplified partially schematic, partially pictorial illustration of wavefront analysis functionality. The functionality of FIG. 1 can be summarized as including the following sub functionalities:

I. Obtaining a plurality of differently phase changed transformed wavefronts corresponding to a wavefront being analyzed, which has an amplitude and a phase;
II. Obtaining a plurality of intensity maps of the plurality of phase changed transformed wavefronts; and
III. Employing the plurality of intensity maps to obtain an output indicating at least one and possibly both of the phase and the amplitude of the wavefront being analyzed.

As seen in FIG. 1, the first sub-functionality, designated "A" may be realized by the following functionalities: A wavefront, which may be represented by a plurality of point sources of light, is generally designated by reference numeral 100. Wavefront 100 has a phase characteristic which is typically spatially non-uniform, shown as a solid line and indicated generally by reference numeral 102. Wavefront 100 also has an amplitude characteristic which is also typically spatially non-uniform, shown as a dashed line and indicated generally by reference numeral 103. Such a wavefront may be obtained in a conventional manner by receiving light from any object, such as by reading an optical disk, for example a DVD or compact disk 104.

The method enables the measurement of the phase characteristic, such as that indicated by reference numeral 102, and the amplitude characteristic, such as that indicated by reference numeral 103 in an enhanced manner. It should be noted that since, by definition of phase, a phase characteristic is a relative characteristic, the term refers to the relative phase map or to the phase differences between any two points in the wavefront. In general, throughout this application, and where claimed, all references relating to measurements or calculations of "phase", or similar recitations such as phase maps, are understood to mean such measurements or calculations of a phase shift, or of a phase difference, or of a relative phase referred to the particular phase context under discussion in that location.

A transform, indicated symbolically by reference numeral 106, is applied to the wavefront being analyzed 100, thereby to obtain a transformed wavefront, symbolically indicated by reference numeral 108. A plurality of different phase changes, preferably spatial phase changes, represented by optical path delays 110, 112 and 114 are applied to the transformed wavefront 108, thereby to obtain a plurality of differently phase changed transformed wavefronts, represented by reference numerals 120, 122 and 124 respectively. It is appreciated that the illustrated difference between the individual ones of the plurality of differently phase changed transformed wavefronts is that portions of the transformed wavefront are delayed differently relative to the remainder thereof.

The second sub-functionality, designated "B", is realized by applying a transform, preferably a Fourier transform, to the plurality of differently phase changed transformed wavefronts. Finally, functionality B requires detection of the intensity characteristics of plurality of differently phase changed transformed wavefronts. The outputs of such detection are the intensity maps, examples of which are designated by reference numerals 130, 132 and 134.

The third sub-functionality, designated "C" may be realized by the following functionalities: expressing, such as by employing a computer 136, the plurality of intensity maps, such as maps 130, 132 and 134, as at least one mathematical function of phase and amplitude of the wavefront being analyzed and of the plurality of different phase changes, wherein at least one and possibly both of the phase and the amplitude are unknown and the plurality of different phase changes, typically represented by optical path delays 110, 112 and 114 to the transformed wavefront 108, are known; and employing, such as by means of the computer 136, the at least one mathematical function to obtain an indication of at least one and possibly both of the phase and the amplitude of the wavefront being analyzed, herein represented by the phase function designated by reference numeral 138 and the amplitude function designated by reference numeral 139, which, as can be seen, respectively represent the phase characteristics 102 and the amplitude characteristics 103 of the wavefront 100. Wavefront 100 may represent the information contained or the height map of the measured object, such as compact disk or DVD 104 in this example.

An example of a simplified partially schematic, partially block diagram illustration of a wavefront analysis system suitable for carrying out the functionality of FIG. 1 is depicted in FIG. 2. As seen in FIG. 2, a wavefront, here designated by reference numeral 150 is focused, as by a lens 152, onto a phase manipulator 154, which is preferably located at the focal plane of lens 152. The phase manipulator 154 generates phase changes, and may be, for example, a spatial light modulator or a series of different transparent, spatially non-uniform objects. A second lens 156 is arranged so as to image wavefront 150 onto a detector 158, such as a CCD detector. Preferably the second lens 156 is arranged such that the detector 158 lies in its focal plane. The output of detector 158 is preferably supplied to data storage and processing circuitry 160, which preferably carries out functionality "C" described herein above with reference to FIG. 1.

A simplified partially schematic, partially pictorial illustration of a system for surface mapping employing the functionality and structure of FIG. 1, is depicted in FIG. 3. As seen in FIG. 3, a beam of radiation, such as light or acoustic energy, is supplied from a radiation source 200 optionally via a beam expander 202, onto a beam splitter 204, which reflects at least part of the radiation onto a surface 206 to be inspected. The radiation reflected from the inspected surface 206, is a surface mapping wavefront, which has an amplitude and a phase, and which contains information about the surface 206. At least part of the radiation incident on surface 206 is reflected from the surface 206 and transmitted via the beam splitter 204 and focused via a focusing lens 208 onto a phase manipulator 210, which is preferably located at the image plane of radiation source 200. The phase manipulator 210 may be, for example, a spatial light modulator or a series of different transparent, spatially non-uniform objects. A second lens 212 is arranged so as to image surface 206 onto a detector 214, such as a CCD detector. Preferably the second lens 212 is arranged such that the detector 214 lies in its focal plane. The output of detector 214, an example of which is a set of intensity maps designated by reference numeral 215, is preferably supplied to data storage and processing circuitry 216, which preferably carries out functionality "C" described hereinabove with reference to FIG. 1, providing an output indicating at least one and possibly both of the phase and the amplitude of the surface mapping wavefront. This output is preferably further processed to obtain information about the surface 206, such as geometrical variations and reflectivity of the surface. The phase manipulator 210 is described as applying a plurality of different spatial phase changes to the radiation wavefront reflected from surface 206 and Fourier transformed by lens 208. Application of the plurality of different spatial phase changes provides a plurality of differently phase changed transformed wavefronts which may be subsequently detected by detector 214.

The general principles of the algorithms and computation methods are depicted in FIG. 4, which depicts a simplified functional block diagram illustration of part of the functionality of FIG. 1. In the exemplary arrangement shown in FIG. 4, the transform applied to the wavefront being analyzed is a Fourier transform, at least three different spatial phase changes are applied to the thus transformed wavefront, and at least three intensity maps are employed to obtain indications of at least one of the phase and the amplitude of the wavefront. As seen in FIG. 4, and designated as sub-functionality "C" hereinabove with reference in FIG. 1, the intensity maps are employed to obtain an output indication of at least one and possibly both of the phase and the amplitude of the wavefront being analyzed.

It is seen in FIG. 4 that the wavefront being analyzed is expressed as a first complex function $f(x)=A(x)e^{i\phi(x)}$, where 'x' is a general indication of a spatial location. The complex function has an amplitude distribution $A(x)$ and a phase distribution $\phi(x)$ identical to the amplitude and phase of the wavefront being analyzed. The first complex function $f(x)=A(x)e^{i\phi(x)}$ is indicated by reference numeral 300. Each of the plurality of different spatial phase changes is applied to the transformed wavefront preferably by applying a spatially uniform spatial phase delay having a known value to a given spatial region of the transformed wavefront. As seen in FIG. 4, the spatial function governing these different phase changes is designated by 'G' and an example of which, for a phase delay value of $\theta$, is designated by reference numeral 304. Function 'G' is a spatial function of the phase change applied in each spatial location of the transformed wavefront. In the specific example designated by reference numeral 304, the spatially uniform spatial phase delay, having a value of $\theta$, is applied to a spatially central region of the transformed wavefront, as indicated by the central part of the function having a value of $\theta$, which is greater than the value of the function elsewhere.

A plurality of expected intensity maps, indicated by spatial functions $I1(x)$, $I2(x)$ and $I3(x)$, are each expressed as a function of the first complex function f(x) and of the spatial function G, as indicated by reference numeral 308. Subsequently, a second complex function S(x), which has an absolute value $|S(x)|$ and a phase $\alpha(x)$, is defined as a convolution of the first complex function f(x) and of a Fourier transform of the spatial function 'G'. This second complex function, designated by reference numeral 312, is indicated by the equation $S(x)=f(x)*\Im(G)=|S(x)|e^{i\alpha(x)}$, where the symbol '*' indicates convolution and $\Im(G)$ is the Fourier transform of the function 'G'. The difference between $\phi(x)$, the phase of the wavefront, and $\alpha(x)$, the phase of the second complex function, is indicated by $\psi(x)$, as designated by reference numeral 316.

The expression of each of the expected intensity maps as a function of f(x) and G, as indicated by reference numeral 308, the definition of the absolute value and the phase of S(x), as indicated by reference numeral 312 and the definition of $\psi(x)$, as indicated by reference numeral 316, enables expression of each of the expected intensity maps as a third function of the amplitude of the wavefront A(x), the absolute value of the second complex function $|S(x)|$, the difference between the phase of the wavefront and the phase of the second complex function $\psi(x)$, and the known phase delay produced by one of the at least three different phase changes which each correspond to one of the at least three intensity maps. This third function is designated by reference numeral 320 and includes three functions, each preferably having the general form $I_n(x)=|A(x)+(e^{i\theta_n}-1)|S(x)|e^{-i\psi(x)}|^2$ where $In(x)$ are the expected intensity maps and n=1, 2 or 3. In the three functions, $\theta1$, $\theta2$ and $\theta3$ are the known values of the uniform spatial phase delays, each applied to a spatial region of the transformed wavefront, thus effecting the plurality of different spatial phase changes which produce the intensity maps $I1(x)$, $I2(x)$ and $I3(x)$, respectively. It is appreciated that preferably the third function at any given spatial location x0 is a function of A, $\psi$ and $|S|$ only at the same spatial location x0. The intensity maps are designated by reference numeral 324.

The third function is solved for each of the specific spatial locations x0, by solving at least three equations, relating to at least three intensity values $I1(x0)$, $I2(x0)$ and $I3(x0)$ at at least three different phase delays $\theta1$, $\theta2$ and $\theta3$, thereby to obtain at least part of three unknowns A(x0), $|S(x0)|$ and $\psi(x0)$. This process is typically repeated for all spatial locations and results in obtaining the amplitude of the wavefront A(x), the absolute value of the second complex function $|S(x)|$ and the difference between the phase of the wavefront and the phase of the second complex function $\psi(x)$, as indicated by reference numeral 328. Thereafter, once A(x), $|S(x)|$ and $\psi(x)$ are known, the equation defining the second complex function, represented by reference numeral 312, is typically solved globally for a substantial number of spatial locations 'x' to obtain $\alpha(x)$, the phase of the second complex function, as designated by reference numeral 332. Finally, the phase $\phi(x)$ of the wavefront being analyzed is obtained by adding the phase $\alpha(x)$ of the second complex function to the difference $\psi(x)$ between the phase of the wavefront and the phase of the second complex function, as indicated by reference numeral 336.

A wavefront analysis system may include two functionalities—an imaging functionality and an imaged-wavefront analysis functionality, as depicted in FIG. 5 below. The wavefront to be analyzed, 510 is imaged by the imaging functionality 520, to result an imaged-wavefront 530. The imaged wavefront is analyzed by an imaged-wavefront analysis functionality 540, and the resulting information about the wavefront is subsequently processed and stored, by the data storage and processing component 550. It should be noted that imaging functionality 520 and imaged wavefront analysis functionality 540, can be implemented as two sub-functionality of the same joint system, and in such case the imaged wavefront 530, would be generated internally within the same joint system.

SUMMARY OF THE INVENTION

The present invention seeks to provide improved implementation methods and apparatus to perform wavefront analysis, and 3D measurements and in particular such that are based on analyzing the output of an intermediate plane, such as an image plane, of an optical system. The methods and apparatuses provided can be applied to various wavefront analysis and measurement methods, such as the methods provided in the above mentioned PCT Application No. PCT/IL/01/00335, and in PCT Application No. PCT/IL/02/00096, as well as to other wavefront analysis methods known in the art. The current invention also provides elaborated, improved and enhanced methodologies and systems for wavefront analysis.

In addition, the present invention seeks to provide a new apparatus and method for measurement of surface topography in the presence of thin film coatings, which overcomes some of the disadvantages and shortcomings of prior art methods. There exist a number of prior art methods for analyzing a wavefront reflected from or transmitted through an object, such as by interferometry and the wavefront analysis methods described in the above-referenced patent documents. However, the presence of thin films coatings on the surface of the object, adds an additional phase change to the reflected or transmitted wavefront due to multiple reflections. This phase change causes error in calculating the surface topography from which the wavefront was reflected. Knowledge of the thin films coating thicknesses and the refractive indices of the constituent layers, either by prior knowledge or by direct measurement using known methods, enables the added phase change caused by multiple reflections to be calculated by use of known formulas. This additional phase can be eliminated or subtracted from the phase of the reflected or transmitted light in order to correctly calculate the surface topography.

There is therefore provided, in accordance with a preferred embodiment of the present invention, a phase-measurement system which incorporates the capability of performing accurate measurements also on multi-layered objects, such as in the presence of thin-film coatings. The prior art methods of ellipsometry for performing these operations generally use large illumination spots, which provide poor spatial resolution and poor 2-dimensional imaging capabilities, because of the limited depth of field across the width of such a large illumination spot when large angle of incidence illumination is used. This capability of detection and measurement of multi-layered objects is improved by adding a broadband light source and a filter wheel or a spectrometer to the imaging optical system of the measurement apparatus, such as those described in the above referenced patent documents. Using a filter wheel, the light reflected from the whole field of view is spectrally analyzed independently for each pixel or each segment of the object. Using a spectrometer, the light reflected from one or more selected zones of the object is spectrally analyzed independently for each pixel or segment. The addition of the spectrometer or the filter-wheel enables the measurement of the thicknesses of transparent or semitransparent multi-layers at each segment or each pixel of the object. By combining the phase measurement, the top surface topography is obtained. The thin film coating thicknesses can be calculated accurately, by using the novel spectral analysis methods mentioned above, a predetermined knowledge of the refractive indices and the thicknesses of the layers in the multi-layer stack, and implementing known reflectometry or ellipsometry algorithms. Alternatively and conversely, the refractive indices of the thin films can be calculated accurately, by using the spectral analysis methods mentioned above, predetermined knowledge of the accurate thicknesses of the layers in the multi-layer stack and the known reflectometry or ellipsometry algorithms. Using the known thin film coating thicknesses and the refractive indices at each pixel or each segment of the object, as calculated by the above methods, the phase change due to the presence of the thin film coating can be accurately calculated by known formulae. This phase change, as calculated from the real and complex elements of the refractive index, can be eliminated or subtracted from the measured phase of the reflected or transmitted light in order to attain the surface topography correctly.

In accordance with more preferred methods of the present invention, the phase change due to multiple reflections when measuring an object comprising multi-layers can be calculated by combining Fourier transform spectroscopy with the method of wavefront analysis described above, and using a broadband light source. The Fourier transform spectroscopy is carried out by means of the following steps:

1. Adding a moving mirror as a reference mirror, and generating interference between light impinging on the object and light reflected from the reference mirror, and then acquiring an intensity image of the interference pattern for each movement.
2. Fourier transforming the accumulated intensity data of each pixel to obtain the spectral reflectance of each pixel, in a similar manner to Fourier Transform Spectroscopy.
3. Obtaining the thickness of the layers in each pixel of the object by using the spectral reflectance of each pixel, predetermined data about the materials and existing spectrophotometery or reflectometric models.
4. Calculating the phase change caused by the multi-layer stack in each pixel by using known algorithms and the data obtained about the thickness and the refractive index of the material of each layer at each pixel.
5. Obtaining the reflected wavefront phase and amplitude by use of the method of wavefront analysis mentioned above. This phase data also includes the phase change generated by the multi-layer stack at each pixel.
6. Subtracting the calculated phase change caused by the multi-layer stack at each pixel (as described above in paragraph 4), from the phase data obtained by the wavefront analysis method (as described above in paragraph 5) to obtain the true surface topography.

There is thus provided in accordance with a preferred embodiment of the present invention, a According to yet another preferred embodiment of the present invention, there is further provided as Optical apparatus for measuring the thickness of an object, comprising:

(i) an objective lens disposed above the plane of the object and with its optical axis perpendicular to the plane,
(ii) an illumination source having a range of emitted wavelengths, the source being disposed above the lens and essentially in the focal plane of the lens such that the lens generates a collimated beam therefrom, and the source being laterally offset from the optical axis, such that the collimated beam illuminates the object at a non-normal angle of incidence,
(iii) a first polarizing element disposed between the source and the lens, (iv) a detector element disposed essentially in the image plane of the object generated by the lens, and laterally offset from the optical axis, and
(v) a second polarizing element disposed between the lens and the detector.

The lens preferably has a numerical aperture greater than 0.5. Furthermore, the illumination source may preferably be a broadband source. Additionally, it may have a number of discrete wavelengths. The detector element is preferably a detector array.

In accordance with further preferred embodiments of the present invention, there is provided a method of measuring surface topography of an object having some transparent layers, comprising the steps of:
(i) illuminating the object and measuring the amplitude and phase of a wavefront reflected therefrom, by the steps of (a) obtaining a plurality of differently phase changed transformed wavefronts corresponding to the wavefront whose amplitude and phase are being measured, (b) obtaining a plurality of intensity maps of the plurality of phase changed transformed wavefronts, and (c) employing the plurality of intensity maps to obtain an output indicating the amplitude and measured phase of the wavefront, and
(ii) measuring the thickness of the transparent layers by broadband illumination of the object, and analyzing reflected intensity from the object at at least two wavelengths,
(iii) calculating from the thickness measurement, a calculated phase map of the reflected wavefront due to multiple reflections from the transparent layers, and
(iv) comparing the calculated phase map with the measured phase to obtain the surface topography of the object.

In the above mentioned method, the step of comparing may preferably comprise the subtraction of phase values obtained from the calculated phase map, from the measured phase at the same location on the object.

There is further provided in accordance with another preferred embodiment of the present invention, optical apparatus for measurement of thickness of transparent layers in an object, comprising:
(i) a coherent source for illuminating the object,
(ii) a detector to measure reflectance from the transparent layers,
(iii) an interferometer to measure phase reflected from the object by coherent illumination, and
(iv) a processing unit utilizing the measured phase and the reflectance in a mathematical model describing the expected reflected phase and expected reflected amplitude as a function of thicknesses and optical properties of transparent layers, so as to obtain the thickness of the transparent layers in the object.

A combination of phase, obtained from a coherent light source illumination, and amplitude, obtained from the reflectance of the coherent light-source and/or reflectometry analysis of various techniques using broadband illumination are used in this embodiment. This combination of phase and amplitude provides a better measurement of transparent layer thickness. The phase analysis may originate from an interferometry method using coherent illumination. The reflectometry analysis can be provided from broadband illumination and standard analysis techniques (filter-wheel, spectrophotometer) or from the amplitude analysis of several coherent light-sources.

Additionally, in accordance with yet another preferred embodiment of the present invention, there is provided a method of measurement of thickness of transparent layers in an object, comprising the steps of:

(i) illuminating the object with coherent light at at least one predetermined wavelength,
(ii) providing an interferometer and measuring the phase of the coherent light reflected from the object,
(iii) illuminating the object with light of a plurality of additional predetermined discrete wavelengths,
(iv) measuring the reflectance of the light at the plurality of predetermined discrete wavelengths,
(v) using a mathematical model describing the expected phase and amplitude characteristics of the reflected light at the plurality of predetermined discrete wavelengths, as a function of the thickness and optical properties of transparent layers, and
(vi) utilizing the measured phase and reflectance values in the mathematical model to obtain the thickness of the transparent layers in the object.

In the above-mentioned method, the plurality of predetermined discrete wavelengths may preferably be obtained by use of a filter wheel or by use of a spectrophotometer. Additionally, the plurality of predetermined discrete wavelengths may preferably be obtained from the at least one coherent light-source.

According to another preferred embodiment of the above mentioned method, at least one point in the object may have a known structure, such that the expected phase characteristic delay at the at least one point is known absolutely, and the method also comprises the step of using the absolutely known phase characteristic to determine absolute phase differences over the entire object.

There is also provided in accordance with another preferred embodiment of the present invention, a method for obtaining a focused image of an object comprising the steps of:
(i) illuminating the object,
(ii) obtaining amplitude and phase information of a wavefront of the illumination emanating from the object, in an arbitrary plane at which the wavefront does not necessarily generate a focused image,
(iii) calculating by means of mathematical solutions of the propagation properties of the wavefront, the form of the wavefront at a series of additional planes down the propagation path of the wavefront, and
(iv) determining at which of the additional planes the wavefront has the form of a focused image.

In this method, the step of determining at which of the additional planes the wavefront has the form of a focused image preferably comprises comprises calculating at each of the additional planes, the entropy of the complex function of at least one optical characteristic of the wavefront, wherein the entropy is determined from a measure of the cumulative surface area of the complex function of the wavefront, and determining the propagation step at which the entropy is at a minimum. The complex function of the wavefront may then preferably be at least one of a complex amplitude function, a complex phase function and a complex amplitude and phase function.

According to another preferred embodiment of the present invention, there is further provided a method of measuring a height difference between a first and a second segment of an object comprising the steps of:
(i) illuminating both the segments of the object,
(ii) obtaining amplitude and phase information of a wavefront of the illumination emanating from the object, in an arbitrary plane at which the wavefront does not necessarily generate a focused image,
(iii) calculating by means of mathematical solutions of the propagation properties of the wavefront, the form of the wavefront at a series of additional planes down the propagation path of the wavefront, (iv) determining at which of the additional planes the wavefront has the form of a focused image of the first segment, (v) determining at which of the additional planes the wavefront has the form of a focused image of the second segment, and (vi) obtaining the height difference by subtracting the distance between the additional plane where the wavefront has the form of a focused image of the second segment, and the additional plane where the wavefront has the form of a focused image of the first segment.

In the above mentioned method, the height difference between the two segments may preferably be utilized as an estimated height difference to reduce phase ambiguity arising in other measurement methods.

There is also provided in accordance with another preferred embodiment of the present invention, a method for solving $2\pi$ ambiguity in phase measurement systems comprising the steps of:

(i) illuminating an object at a first wavelength and determining phase information of a first wavefront impinging on the object, (ii) illuminating the object at a second wavelength and determining phase information of a second wavefront impinging on the object, (iii) defining at least two segments in the object, (iv) designating a first set of points in the first segment and a second set of points in the second segment, one of the points in the first set being defined as a first anchor point, and one of the points in the second set being defined as a second anchor point, (v) unwrapping at least one of the first and second phase information to obtain height differences between the first anchor point and the first set of points, and height differences between the second anchor point and the second set of points, (vi) calculating the height difference between points in the first set and points in the second set, using the first and second phase information, to determine a set of height differences corresponding to the sets of pairs of points, (vii) obtaining a set of approximate height ambiguities, each approximate height ambiguity corresponding to one height difference in the set of height differences, (viii) using the set of approximate height ambiguities to determine a set of approximate height ambiguities between the first and the second anchor points, (ix) from the a set of approximate height ambiguities between the first and the second anchor points, determining the most probable value of the height ambiguity between the first and second anchor points, and (x) solving $2\pi$ ambiguity between first and second phase information measurements by utilizing the most probable value of ambiguity.

In this method, the most probable value of the height ambiguity between the first and second anchor points is preferably taken to be the closest to the average value of the set of approximate height ambiguities between the first and the second anchor points. Alternatively and preferably, the most probable value of the height ambiguity between the first and second anchor points may be taken as the maximum of a histogram plot of the set of approximate height ambiguities between the first and the second anchor points.

According to yet another preferred embodiment of the present invention, there is further provided a set of filters for use in spatial filtering in an optical system, each filter having a characteristic-sized opening and characteristic spectral properties, and wherein the opening and the spectral properties of each filter are selected to increase the image contrast in the system. The opening and the spectral properties of each filter are preferably selected in order to mutually offset the effects of increased spatial spread of imaged light with increasing wavelength and decreased spatial spread of imaged light with increasing aperture size. Furthermore, for each of the filters, the ratio of the opening of the filter to the wavelength at which the filter operates is preferably essentially constant. In any of the above-mentioned sets of filters, the spatial filtering is preferably performed between a center area and a peripheral area of the field of view of the imaging system. Use of these sets of filters enables different apertures to be obtained for different wavelengths without mechanical movement.

There is also provided in accordance with an additional preferred embodiment of the present invention, a method of increasing contrast in a imaging system for spatial filtering, comprising the steps of:

(i) providing a birefringent spatial light modulator having at least two separate controllable phase modulating regions and a primary axis, (ii) disposing a linear polarizing element before the birefringent spatial light modulator, where the polarization direction of the linear polarizing element does not coincide with the primary axis of the spatial light modulator, (iii) disposing a linear polarizing element after the birefringent spatial light modulator, (iv) determining a required transmissivity ratio between the two phase modulating regions such that the output image contrast of the image is optimized, (v) obtaining multiple wavefront outputs from the system by rotating at least one of the linear polarizing elements and adjusting the phase delay in at least one of the modulating regions, such that (a) in each wavefront output, a different phase delay is obtained between the two phase modulating regions, (b) all wavefront outputs have the same transmissivity ratio between the two phase modulating regions, and (c) the same transmissivity ratio is equal to the required transmissivity.

According to yet another preferred embodiment of the present invention, there is also provided a method for reducing coherence noise in an optical system, comprising the steps of:

(i) illuminating an object to be imaged, (ii) measuring amplitude and phase information of a wavefront of illumination emanating from the object, in a first plane along the propagation path of the wavefront at which the wavefront generates a focused image, (iii) defocusing the image in the system by a defocusing distance, (iv) obtaining defocused amplitude and phase information of a wavefront of illumination emanating from the object, in a second plane distant from the first plane by the defocusing distance, (v) using the defocused amplitude and phase waveform information, calculating by means of mathematical solutions of the propagation properties of the wavefront, refocused amplitude and phase waveform information at the first focused plane, distant from the second plane by the defocusing distance, and (vi) combining the measured amplitude and phase waveform information and the refocused amplitude and phase waveform information to reduce coherence noise in the imaged object.

In this method, the step of combining is preferably performed by at least one of averaging, comparing, and image processing.

There is additionally provided in accordance with yet another preferred embodiment of the present invention, a method of reducing noise in a wavefront at a first given plane, the noise arising from a disturbance located at a second plane, comprising the steps of:
(i) measuring amplitude and phase information of the wavefront at the given plane,
(ii) calculating by means of mathematical solutions of the propagation properties of the wavefront, amplitude and phase information of the wavefront at additional planes in the propagation path of the wavefront,
(iii) determining at which of the additional planes the wavefront is such that an image containing the disturbance is optimally focussed,
(iv) modifying the wavefront at the optimally focussed location such that the disturbance is cancelled, and
(v) using the modified waveform, calculating by means of mathematical solutions of the propagation properties of the wavefront, new amplitude and phase waveform information at the first plane, from which an image can be obtained without noise arising from the local disturbance.

In this method, the disturbance may arise from dust or a defect in the propagation path of the wavefront. In such a case, the disturbance may preferably be such that it appears as concentric fringes from the dust particle not in focus. Furthermore, the disturbance may preferably be cancelled by image processing.

According to yet another preferred embodiment of the present invention, there is provided a method of reducing an aberration in a wavefront at a given plane of an optical system, the aberration arising elsewhere in the optical system, the method comprising the steps of:
(i) measuring amplitude and phase information of the wavefront at the given plane,
(ii) calculating by means of mathematical solutions of the propagation properties of the wavefront, amplitude and phase information of the wavefront at additional planes in the propagation path of the wavefront,
(iii) determining at which of the additional planes the wavefront is such that the source of the aberration is situated,
(iv) modifying the wavefront at the aberration source location such that the aberration is eliminated, and
(v) using the modified waveform, calculating by means of mathematical solutions of the propagation properties of the wavefront, new amplitude and phase waveform information at another plane, from which an aberration-free image can be obtained.

There is also provided in accordance with another preferred embodiment of the present invention, a method of reducing coherence noise in an image of an object, comprising the steps of:
(i) providing an imaging system comprising an optical path including a coherent illuminating source, a phase manipulator and a number of optical elements,
(ii) measuring amplitude and phase information of a wavefront representing the image of the object at an image plane,
(iii) moving the position of at least one of the object, the illuminating source and at least one of the optical elements and refocusing,
(iv) measuring amplitude and phase information of a wavefront representing the image of the object after the steps of moving and refocusing, and
(v) averaging the amplitude and phase information of the wavefront before and after the moving step, such that the coherence noise is reduced.

In the above mentioned method, the moving preferably comprises moving the source in at least one axis, and corresponding movement of the phase manipulator to maintain it in the image plane of the moving light source, and wherein the images are integrated in the time domain. Additionally, the phase manipulator is maintained in the image plane of the source, and the same points on the source are preferably imaged on the same points of the phase manipulator independently of the moving. The moving may alternatively and preferably comprise moving the phase manipulator within the optical path to generate multiple phase-changed transformed wavefronts, or moving of the object along the Z-axis to different focused and defocused states, or moving the object to different positions off-axis or to different tilt angles. The method also preferably may comprise the step of image registration.

An example of the steps of the above methods could preferably include:
(i) taking an image at a given location of the light-source and the PLM
(ii) moving the PLM along any of its axes
(iii) moving the light-source accordingly so that the image of the light-source falls on the same position of the PLM onto which it fell before the movements
(iv) taking another image in this new positions of PLM and light-source. The result is then that all the required information stays the same in the two images, since it is only required that the light-source and PLM are conjugate, but the beams travel different paths within the system, resulting in different spatial noise patterns, i.e. different sets of fringes.
(v) averaging these two images to improve the signal to noise ratio
(vi) repeating this process for several images and thus improving the signal to noise ratio even further, and finally
(vii) utilizing the "average image" as the input for the phase measurement system and obtaining phase with less noises.

According to a further preferred embodiment of the present invention, the optical path may preferably include a rotating wedge disposed such that the optical path performs spatial motion with rotation of the wedge, but without requiring motion of any other of the optical elements.

According to another preferred embodiment of the present invention, there is provided a method of reducing coherence noise in an imaging system, comprising the steps of:
(i) imaging an object using a moderately wideband light source to achieve a smooth image having a first level of accuracy,
(ii) determining preliminary calculated heights of features of the object to within the limitations of the phase ambiguity, the first level of accuracy being limited by the short coherence length of the wideband source,
(iii) imaging the object using a coherent light source to achieve an image noisier than the smooth image, but having a second level of accuracy, better than the first level of accuracy, and
(iv) using the preliminary calculated heights of features of the object as initial inputs for the phase obtained by the coherent imaging, to determine the heights of the features with increased accuracy.

There is further provided in accordance with another preferred embodiment of the present invention, a method of using an imaging system to determine the position of an edge of a feature of an object with a resolution better than the resolving power of the imaging system, comprising the steps of:
(i) producing a series of images of the feature at a number of different defocused distances around the point of best focus, and generating records of the illumination levels as a function of lateral distance across the images, and
(ii) inspecting the records for a point at which the illumination levels converge at a common lateral distance across the images, the point being the position of the edge of the feature.

Finally, in accordance with yet another preferred embodiment of the present invention, there is further provided a method of performing an overlay measurement in a multilayered structure, comprising the steps of:
(i) illuminating the multilayer structure and generating amplitude and phase information of a first complex wavefront map representing the image of a plane in a first layer of the multilayered structure,
(ii) calculating by means of mathematical solutions of the propagation properties of the wavefront, amplitude and phase information of a second complex wavefront map representing the image of a plane in a second layer of the multilayered structure, and
(iii) comparing the first and the second complex wavefront maps to provide information about the overlay of the first and second layers.

In this method, the overlay measurement is preferably performed in a single imaging process, without the need for imaging system refocusing. Furthermore, by this method, the use of the amplitude and phase information in the overlay measurement preferably enables increased contrast measurements to be made in comparison to imaging methods which do not use phase information. It also enables three dimensional information to be obtained about the multilayered structure, thereby improving misregistration measurements in comparison to imaging methods which do not use phase information. Also, use of the phase information in the overlay measurement enables an increased depth of focus measurement to be made in comparison to imaging methods which do not use phase information, thereby enabling imaging of more than one layer in a single imaging process.

BRIEF DESCRIPTION OF THE DRAWINGS

The present invention will be understood and appreciated more fully from the following detailed description, taken in conjunction with the drawings.

FIG. 1 shows a simplified partially schematic, partially pictorial illustration of wavefront analysis functionality;

FIG. 2 is an example of a partially schematic, partially block diagram illustration of a wavefront analysis system suitable for carrying out the functionality of FIG. 1;

FIG. 3 is a partially schematic, partially pictorial illustration of a system for surface mapping employing the functionality and structure of FIG. 1;

FIG. 4 illustrates the general principles of the algorithms and computation methods used in various embodiments of the present application, and depicts a simplified functional block diagram illustration of part of the functionality of FIG. 1;

FIG. 5 depicts a schematic wavefront analysis system including two functionalities—an imaging functionality and an imaged-wavefront analysis functionality;

FIG. 7 is a graphic example of the phase and amplitude of reflected light from a multi-layer stack of silicon oxide on silicon for three different wavelengths;

FIG. 19 is an illustration of an image of a microstructure taken with a microscope having a ×50 objective, to illustrate methods of increasing resolution in such images;

FIG. 20 shows an enlarged portion of the image of FIG. 19, illustrating how the details of the edges in the image are blurred due to the limited resolving power of the microscope;

DETAILED DESCRIPTION OF PREFERRED EMBODIMENTS

Figure 6:
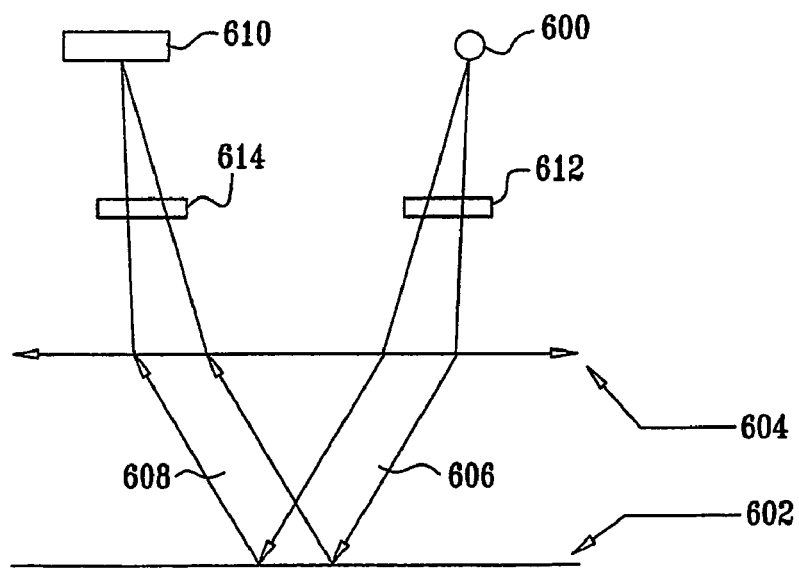
FIG. 6 illustrates schematically elements of a first preferred embodiment of the present invention, enabling the detection and measurement of a multi-layer object by means of ellipsometry, and using methods of phase measurement described in the apparatus and methods shown in FIGS. 1 to 5.

Reference is now made to FIG. 6, which illustrates schematically elements of a first preferred embodiment of the present invention, enabling the detection and measurement of a multi-layer object by means of Ellipsometry, and using methods of phase measurement previously described above. The illumination light source 600 is placed in the optical system in such a way that the surface of the object 602 is illuminated through an imaging system such as a microscope objective 604 with a tilted parallel light beam 606, at a known angle of incidence relative to the normal to the surface of the object. The illuminating light beam 608 is reflected from the object's surface, and is refocused onto the detector 610, which is preferably a pixelated array, by means of the high numerical aperture objective lens 604. By this means, the reflected beam produces an image on the detector, containing information from over a large field of view. Because of the angle of incidence at which the measurement is performed, the reflection for s- and p-polarizations are different, and thus enable the determination of the thickness of each pixel by means of ellipsometry. A polarizing element 612 is positioned in the incident beam, preferably between the source 600 and the objective lens 604, and the polarization analyzed in the reflected beam by means of a polarizing element 614 positioned in the reflected beam, preferably between the objective lens 604 and the detector element 610, using polarizers and compensators. The measurement is performed over a comparatively large field of view at a time, and the use of imaging ellipsometry enables a higher spatial resolution to be achieved. Using these resulting measurements, the known angle of incidence, knowledge of the refractive indices, knowledge of the nominal thicknesses of the layers in the multi-layer stack and known algorithms, the thin films coatings thicknesses at each pixel or each segment of the object, can be calculated accurately. Alternatively and conversely, using the spectral analysis methods mentioned above, prior knowledge of the thicknesses of the layers in the multi-layer stack and known algorithms, the refractive indices of the thin films at each pixel or each segment of the object can be calculated accurately. Knowledge of the thin film coating thicknesses and the refractive indices, enables the phase change due to the presence of thin film coating at each pixel or each segment of the object to be calculated by known formulas. This phase change can be eliminated or subtracted from the phase of the reflected or transmitted light in order to attain the surface topography correctly. The illumination light can be either a coherent light source containing one single wavelength, several coherent light sources or broadband light sources. The reflected light can be spectrally analyzed to provide more information for calculating the thin films coatings thicknesses or refractive indices.

The wavefront reflected from the object is measured twice, for each of the two polarizations. By dividing the measured complex amplitude of one polarization with the measured complex amplitude of the second polarization, the phase change due to the surface topography is canceled out. Using these measurements, the known angle of incidence, prior knowledge of the refractive indices, prior knowledge of the thicknesses of the layers in the multi-layer stack and known algorithms, the thin films coating thicknesses at each pixel or each segment of the object can be calculated accurately. Alternatively, using the measurements mentioned above, prior knowledge of the accurate thicknesses of the layers in the multi-layer stack and known algorithms, the refractive indices of the thin films at each pixel or each segment of the object, can be calculated accurately. Knowing the thin films coatings thicknesses and refractive indices, the phase change due to the presence of thin films coating at each pixel or each segment of the object, can be calculated by known formulae. This phase change can be eliminated or subtracted from the phase of the reflected or transmitted light in order to attain the surface topography correctly. The illumination light can be either a coherent light source containing one single wavelength, several coherent light sources or broadband light sources. The reflected light can be spectrally analyzed to provide more information for calculating the thin films coatings thicknesses or refractive indices.

In accordance with a further preferred embodiment of the present invention, the spectral information of the reflected light is used in combination with a measured reflected wavefront phase to find the thicknesses of the layers in a multi-layer stack. Using a broadband light source, the reflected light from a multi-layer object is analyzed by means of a filter wheel or a spectrometer. In addition, the phase and amplitude of the reflected wavefront are obtained by using coherent light sources with one or more wavelengths and a phase-measurement system. The phase data obtained by a phase-measurement system adds additional data to the spectral analysis mentioned above. Both the phase data obtained by a phase-measurement system and the spectral analysis mentioned above, are combined to find the thicknesses of layers in the multi-layer stack. Since only relative phase data can be obtained, i.e. the relative phase difference between different positions, and not the absolute phase shift, it is desired that there be a position in the field of view at which the thicknesses of the thin films coatings thicknesses are known with high accuracy. The absolute phase-shift can be determined by the measurement performed at this position. Alternatively, a position in the field of view in which there are no transparent layers can also serve as the position in which the thicknesses are known with high accuracy. An example of the phase and amplitude of reflected light from a multi-layer stack of silicon oxide on silicon for three different wavelengths is shown in FIG. 7.

It is noted that that FIG. 7 depicts the thickness dependence in phase and amplitude of 3 wavelengths, i.e. corresponding to a situation where the phase analysis is done by interferometry of 3 coherent light-sources. In order to get more data, each phase provides different data, while the reflectance analysis is done on the reflectance of these same 3 light-sources by analyzing their amplitudes. Another thing to note from the image is that the type of ambiguity in phase and amplitude measurement of thickness is different—when the amplitude ambiguity is periodic. Thus when an amplitude of 0.6 is obtained, one cannot know if the thickness is ~0 nm, ~180 nm, ~350 nm etc' according to FIG. 7A. The "uncertainty range" in phase measurement is a range of thicknesses, i.e. when one gets a phase of "1" in one of the wavelengths, a thickness of 400-500 nm can be the result of this thickness. The combination of these two types of data, with different uncertainties or ambiguities enables pin-pointing the thickness with almost no ambiguity.

According to further preferred embodiments of the present invention, improved algorithms for phase reconstruction and surface topography measurements in the presence of thin films are now described. The presence of thin film coatings adds a phase change to the reflected or transmitted wavefront due to multiple reflections. This phase change causes error (i.e. deviation from the wave front generated from a reflective object) in calculating the surface topography from which the wavefront was reflected. Knowing the thin film coating thicknesses and refractive indices, the added phase change can be calculated by known formulae and can be eliminated or subtracted from the phase of the reflected or transmitted light in order to calculate the surface topography correctly. In accordance with this preferred embodiment of the present invention, at least one anchor point is provided in the field of view, at which the thicknesses of the thin films coatings are known with high accuracy. A position in the field of view at which there are no thin film coatings can also serve as an anchor point. In addition, the phase data or amplitude data or a combination of phase and amplitude data of the reflected wavefront at one or more wavelengths from the object are also given. These anchor points are used to obtain the thickness at other points or in other areas of the stack structure in the field of view, regardless of where the anchor points are located.

Figure 8:
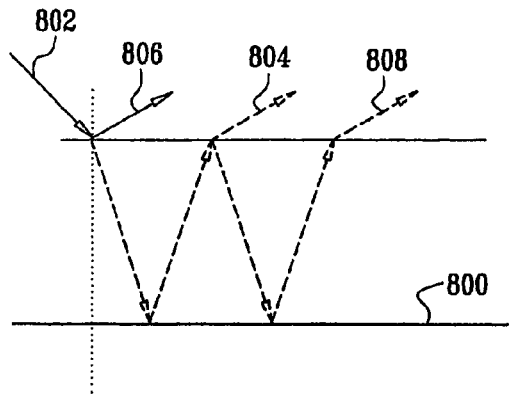
FIG. 8 illustrates schematically a method of decreasing the effect of phase changes due to multiple reflections when illuminating an object consisting of multi-layers, by use of appropriate illumination conditions.

In accordance with a further preferred embodiment of the present invention, there is provided a method of decreasing the effect of phase changes due to multiple reflections when illuminating an object consisting of multi-layers, by use of appropriate illumination conditions. This is illustrated in FIG. 8. According to a first such embodiment, the object 800 comprising multi-layers, is illuminated with a tilted light beam 802 at a large angle of incidence. Because of the large angle of incidence, the amplitudes of the multiple reflections 808 are diminished and only one reflection from each side of each layer is dominant. In the example shown in FIG. 8, there is one reflection 804 from the front surface of the outermost layer, and one reflection 806 from the back surface of the outermost layer. Thus, a simplified model of reflection, assuming only one reflection from each side of each layer, can be used. Deviation of the calculations of the phase change using the simplified 2-beam model, from the calculations of the phase change using the complete ellipsometric model with multiple reflections, is reduced. According to another embodiment, the object is illuminated with a tilted parallel light beam at the Brewster angle (if there is one) between the outermost layer and the layer immediately beneath this outermost layer. In this case, there is no reflection for the p-polarization of light from the surface between these two layers, and only the s-polarization is reflected off this surface. As a consequence, all of the multiple reflections 804, 808, etc., are of s-polarization. If a crossed polarizer is disposed in the reflection path, only p-polarization light is transmitted and measured, and since this s-polarization arises only from the first reflection, this measurement enables the outer surface profile to be readily measured, without interference form underlying layers.

In accordance with the methods of this embodiment, an algorithm for using white-light interferometry for topography measurements in the presence of one or multiple transparent layers is presented. The algorithm includes the following steps:
A. Taking "standard" white-light interferometry images intensity data
B. Fourier transforming the intensity data of each pixel to obtain the spectral reflectance of each pixel, in a similar manner to Fourier Spectroscopy.
C. Using existing "spectrophotometery" models, known data regarding the thickness and refractive index of the materials at each pixel and the calculated spectral reflectance at each pixel as described above in step B, to obtain the accurate thicknesses of the layers at each pixel.
D. Using known algorithms and the data about the thicknesses and the refractive indices of the materials of the layers at each pixel to calculate the phase change caused by the multi-layer stack at each pixel.
E. Using the intensity data acquired by the white-light interferometry to obtain the contours of the object by "best focusing" the wave-packet. These contours include errors due to the phase change induced by the multi-layer stack at each pixel.
F. Using the calculate phase change caused by the multi-layer stack at each pixel (as described above in step D), to correct the errors of the coherence envelope peak caused by the phase, and obtaining the corrected surface topography.

Figure 9:
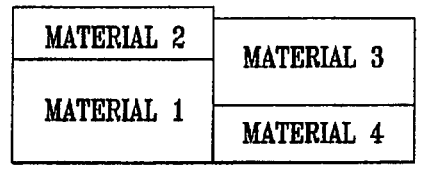
FIG. 9 shows schematically how phase measured data can be used to differentiate between different multi-layer stacks that have the same reflectance but different phase changes, and cannot be differentiated by "white-light" methods.

In order to add prior knowledge to increase the range of height measurements, or to operate with an object consisting of different multi-layer stacks, the field of view is preferably divided into different segments, each with different characteristics, such that for each different segment, the different prior knowledge of its characteristics can be added. There are known in the prior art, several "white-light" methods for performing segmentation based on amplitude data only. However, according to this preferred embodiment of the present invention, both the phase and the amplitude data obtained by a phase-measurement system are utilized in a combined manner to improve the process of obtaining the object's surface segmentation. In a preferred embodiment, at least two wavefronts representing the image of an object at two different wavelengths are obtained, where each wavefront has phase and amplitude data, and these phase and amplitude data are used to perform segmentation of the image. This method can be used to correct the segmentation obtained from "white-light", by known methods. Alternatively and preferably, this data can be used to differentiate between different multi-layer stacks that have the same reflectance but different phase changes (and cannot be differentiated by "white-light" methods), as illustrated in FIG. 9.

Figure 1:
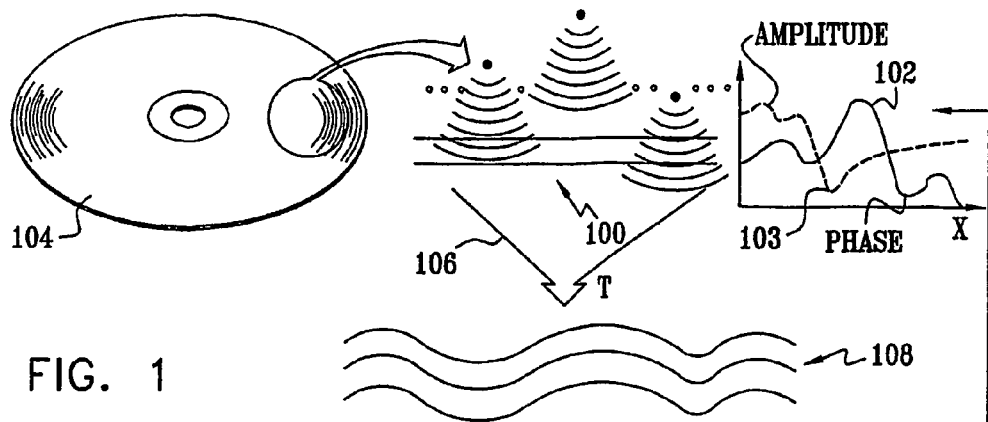
FIGS. 1 to 5 are described briefly in the background, and the remaining drawings in the following detailed description. The drawings can be summarized as follows.
Figure 1:
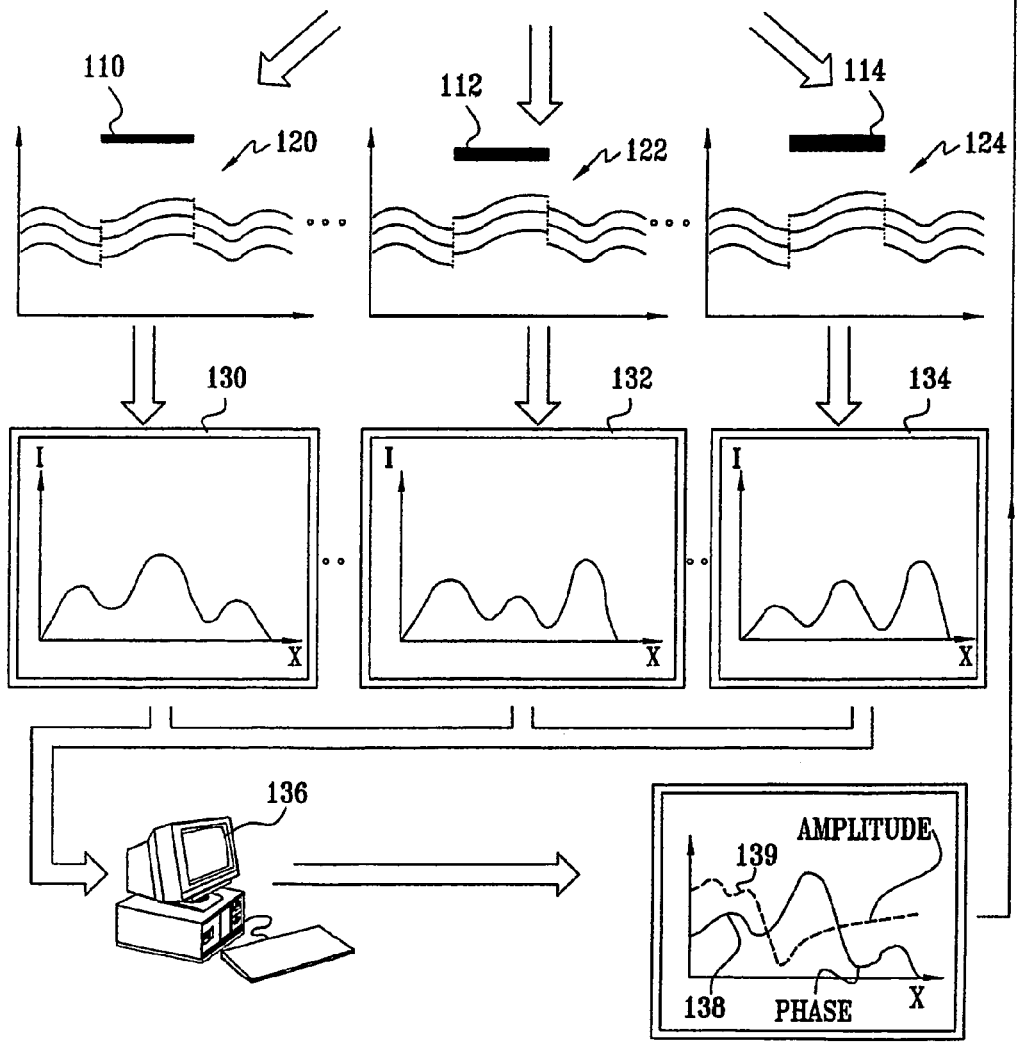
Figure 2:
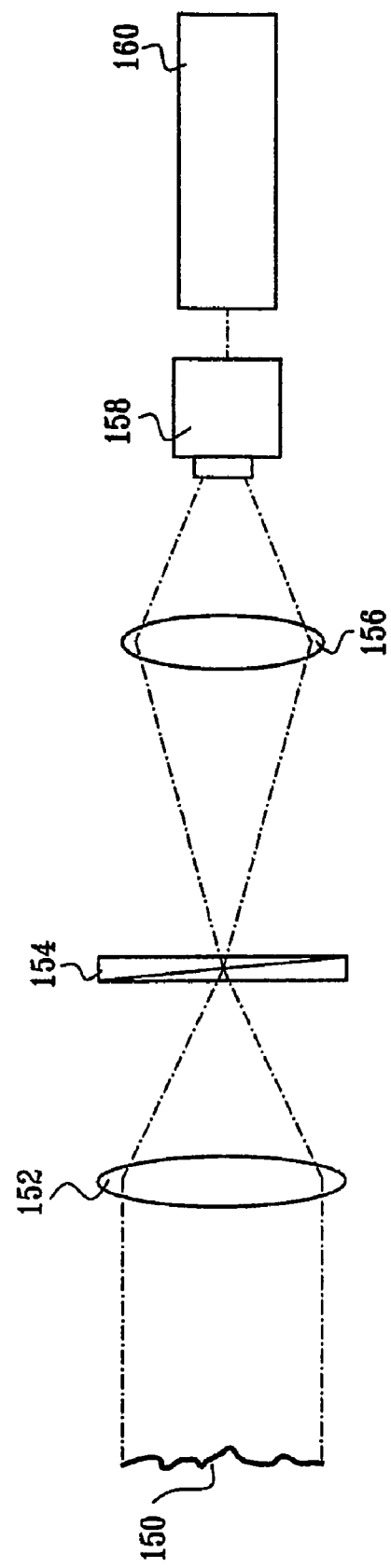
Figure 3:
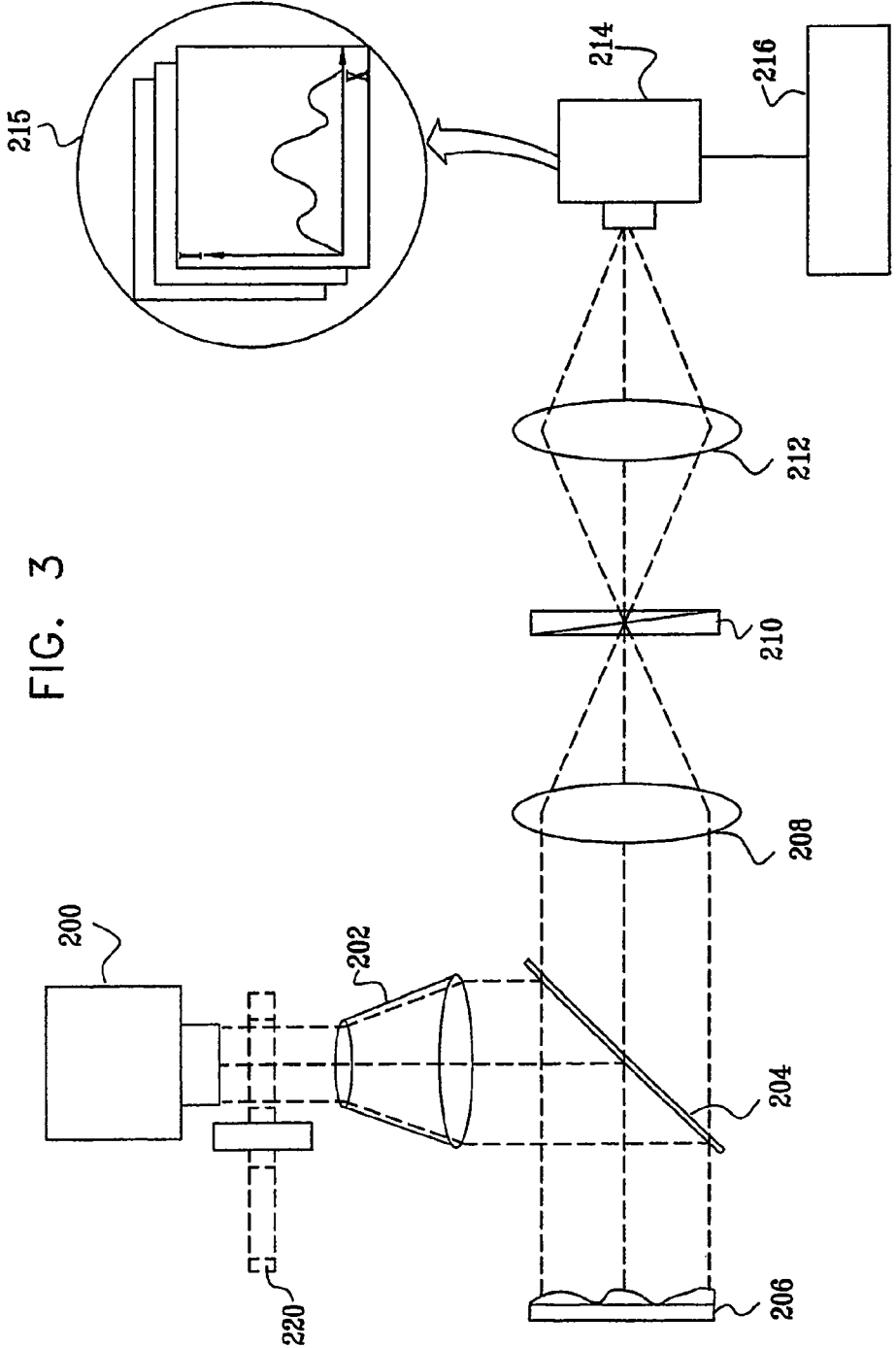
Figure 4:
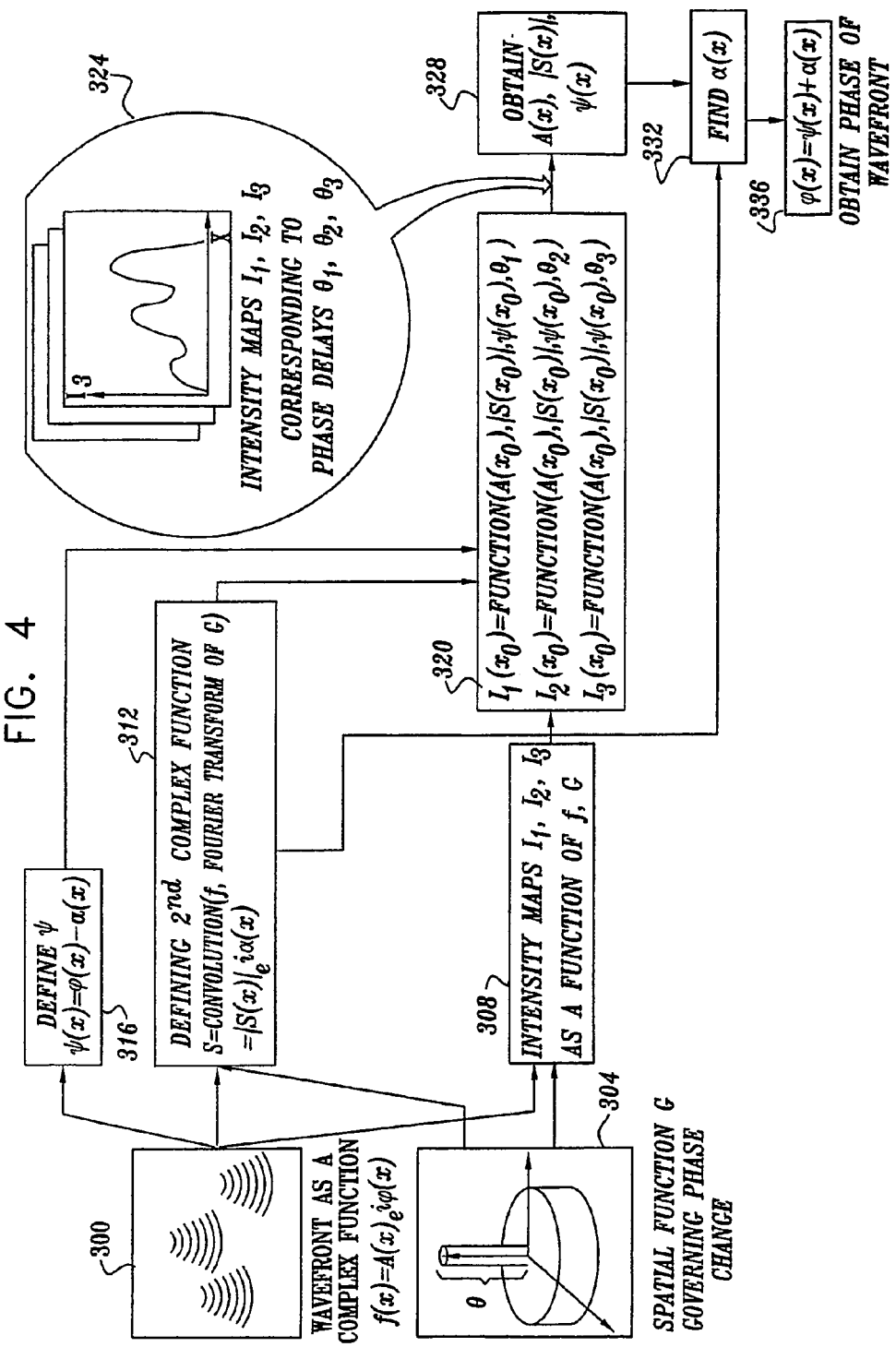
Figure 5:
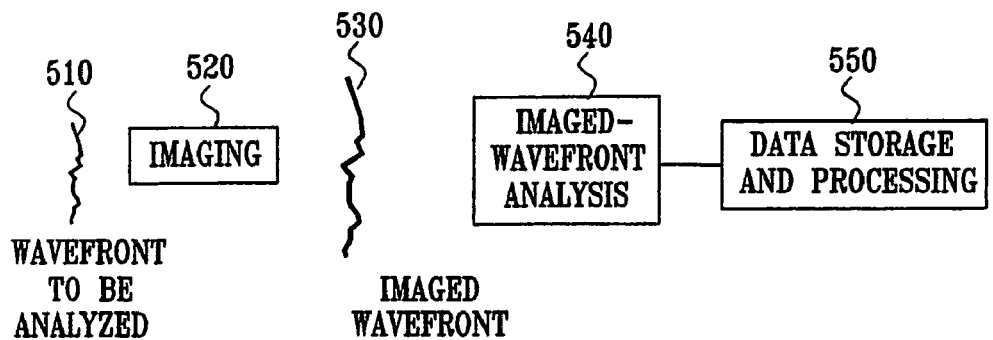

In the wavefront analysis method described above, each of the plurality of different spatial phase changes is applied to the transformed wavefront, preferably by applying a spatially uniform phase delay having a known value, to a given spatial region of the transformed wavefront. As seen in the description associated with prior art FIG. 4 above, the spatial function governing these different phase changes is designated by 'G'. The function 'G' is a spatial function of the phase change applied in each spatial location of the transformed wavefront. In a preferred embodiment, the spatial phase change is applied to the central part of the transformed wavefront and acts as a lowpass filter for the transformed wavefronts. However, when the spatial dimensions of the function 'G' are large, it does not act as a true lowpass filter. In this case, it is difficult to reconstruct the imaged wavefront. Moreover, the spatial dimensions of the function 'G' are scaled according to the wavelength used and thus does not act as a lowpass filter for shorter wavelengths. In accordance with further preferred methods of the present invention, an improved algorithm is implemented. According to the improved algorithm, a basic reconstruction with a "false" 'G' with small spatial dimensions is performed. From this reconstructed wavefront, a new "S" function is obtained by digital lowpass filtering corresponding to the "true" spatial dimensions, and corrected values of $\alpha(x)$ and $\psi(x)$ are calculated. These corrected values are used to obtain a corrected reconstruction. Continuing this process iteratively increases the accuracy of the reconstruction.

Figure 10:
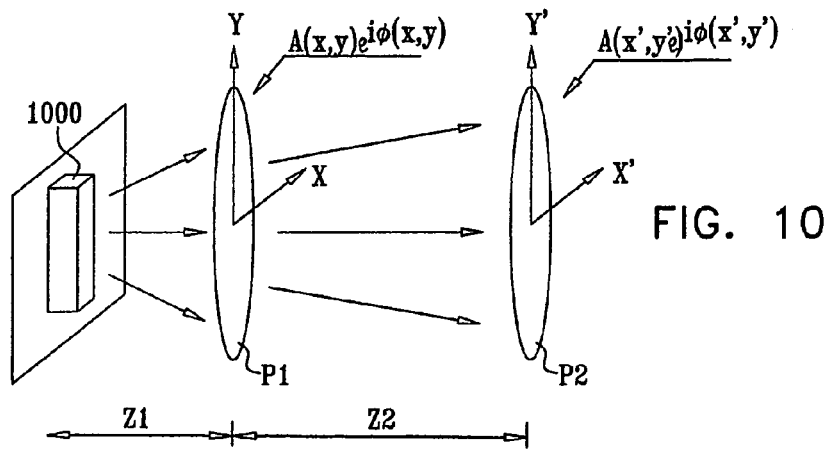
FIG. 10 depicts schematically propagation of a wavefront in the Z direction to illustrate the wavefront analysis method by which any known wavefront in a certain plane can be propagated to any other desired plane by use of known propagation formulae.

In accordance with further preferred methods of the present invention, there are also provided methods of improving phase and surface topography measurements by wavefront propagation and refocusing. Since, as is known, Maxwell's equations have unique solutions, when a specific solution in an arbitrary plane and all of its boundary conditions are known, the solution in any other plane can be determined absolutely. Accordingly, the radiation complex amplitude can be analyzed or retrieved at an arbitrary plane by the wavefront analysis method described above or by any known wavefront retrieval method in a certain plane, and can be propagated to any other desired plane by known formulae. Reference is now made to FIG. 10, which depicts schematically propagation of a wavefront in the Z direction. A wavefront in the form of a box 1000 and with given amplitude propagates a distance Z1 to the plane P1. In plane P1 the complex amplitude of the propagated radiation can be described by the function $A(x,y)e^{i\phi(x,y)}$. The amplitude in P1 is no longer uniform. The complex amplitude of the radiation in plane P1 propagates a further distance Z2 to the plane P2. As the wavefront complex amplitude propagates, the amplitude and the phase are changed and a different complex amplitude described by the function $A'(x,y)e^{i\phi'(x,y)}$ is obtained at plane P2. If the wavefront is known in one plane, it can be calculated in any other plane. In the above mentioned PCT International Publication No. WO 03/062743 a method is described for obtaining different "focusing" states by software propagation namely, by the use of algorithms based on the solution of Maxwell's equations, to calculate the physical propagation of the wavefront. Using this methodology, if the measuring device were not focused onto the object to be measured, the complex amplitude of the (unfocused) measured wavefront can be propagated from the measuring plane to any other desired plane to obtain a wavefront corresponding to a focused image.

Figure 11:
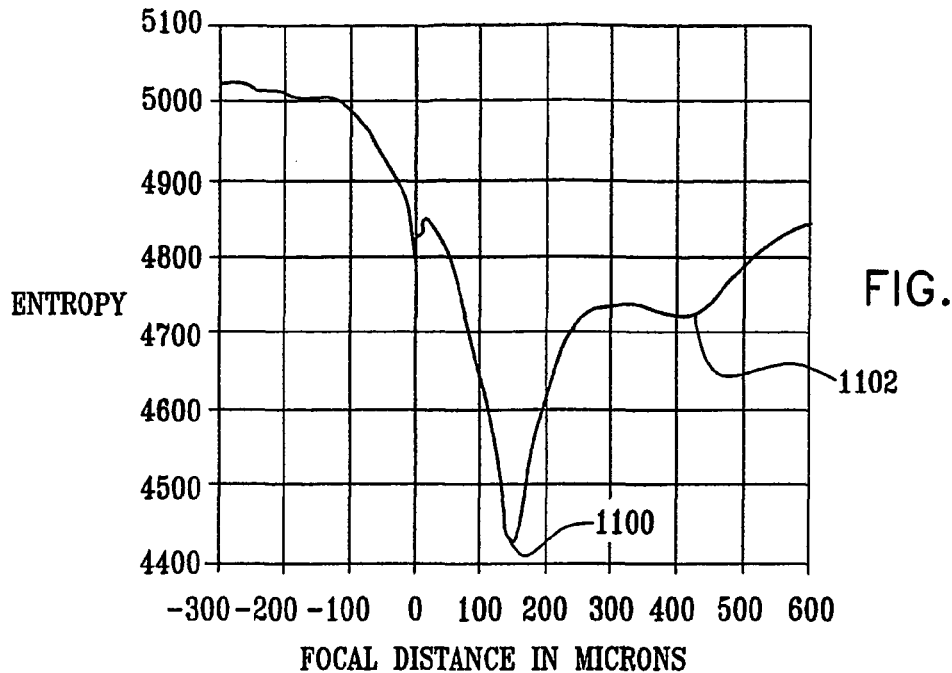
FIG. 11 shows the entropy plot of an arbitrary wavefront as a function of its propagation position along the focal distance.

Accordingly, the best focus plane can be obtained from a series of propagated wavefronts or a series of images, by finding the wavefront or image that has, what is termed, "minimal entropy". An example of entropy useful in this connotation is the cumulative "surface area" of the complex amplitude function of the wavefront. This surface area could preferably be obtained, for instance, by integration of the complex amplitude function of the wavefront. Another possible example of entropy is the cumulative surface area of the amplitude function of the wavefront alone, or the cumulative surface area of the phase function of the wavefront. A series of wavefronts can be obtained by software propagation of a measured complex wavefront to different planes using the known propagation formulae. A series of images can be obtained from a software refocus or from any other source, such as from different focus positions of the object. For intensity images, a possible definition of entropy is the cumulative surface area of the intensity function of the image. Reference is now made to FIG. 11, which shows the entropy plot of an arbitrary wavefront as a function of its propagation position along the focal distance. The focal distance at the zero of the abscissa represents the starting plane in which the wavefront was measured. It can be seen that as the focus is advanced through the best focus 1100, the entropy goes through a well-defined minimum. The local minimum 1102 at the right hand side of the graph, is an artifact due to the position of the beam limiting aperture coming into focus.

Figure 12:
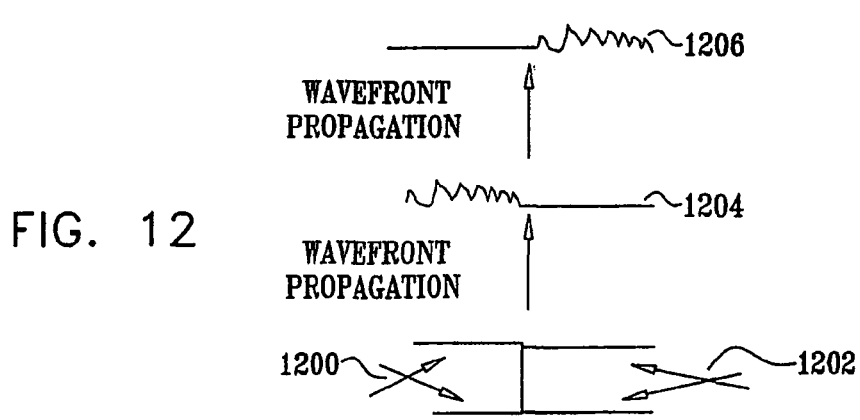
FIG. 12 is a schematic illustration of the method of "best focusing" applied to different segments of an image or of a wavefront independently.

In accordance with another preferred method of the present invention, and with reference to the schematic illustration of the method in FIG. 12, "best focusing" is applied to different segments of the image or of the wavefront 1200, 1202 independently. By using wavefront propagation from the plane of "best focus" 1204 of one segment to the plane of "best focus" 1206 of another segment, the height difference between these two segments can be determined as the propagation distance between the two focusing planes, as depicted schematically in FIG. 12. In addition the entropy of a segment can itself serve as a measure or as an initial estimate for the amount of defocus of the segment. In other words, by measuring the Entropy of different segments, one can calculate or estimate the difference in focal position from a predetermined knowledge of the rate of convergence of the entropy function, and thus the height difference between the different segments. Accordingly, all these 3 steps can be incorporated into a height measurement method, namely:

(i) obtaining several complex wavefronts and corresponding images, by wavefront propagation of a measured wavefront, each complex wavefront corresponding to a different focus state, (ii) determining the "best focus" complex wavefront per segment by applying the minimal entropy algorithm for each segment, and (iii) calculating the height difference between any two segments by the "propagation distance" between the best focus complex wavefront corresponding to the first segment and the best focus complex wavefront corresponding to the second segment.

It should be noted that an image in which both segments are in-focus can be constructed by propagation even without computing the height-difference between the segments.

Figure 13:
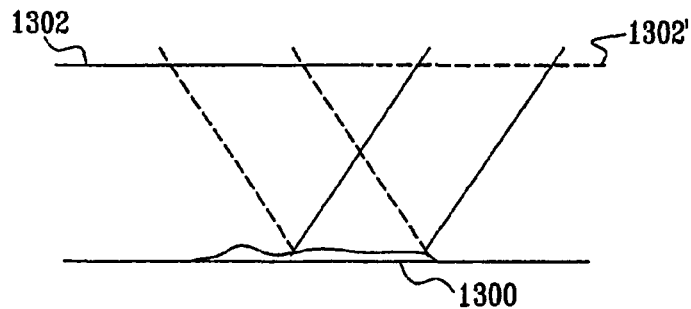
FIG. 13 illustrates another preferred method of the present invention, using best focusing and height measurements obtained by applying stereoscopic wavefront propagation methods.

In accordance with another preferred method of the present invention, best focusing and height measurements can be obtained by applying stereoscopic wavefront propagation. Reference is now made to FIG. 13, which illustrates an object 1300 being viewed using this approach, in which the wavefront is imaged while propagated in a certain specified direction only, by using only part of the angular spectrum of the wavefront, according to the direction in which it is propagated. Propagation in this desired direction is achieved by means of a virtual aperture stop 1302. The wavefront is then propagated again by means of software in a different directions by virtually moving the aperture stop 1302' to its dotted position in FIG. 13, so as to image another part of the angular spectrum, shown dotted in FIG. 13, according to the direction in which it is propagated. Accordingly, two different wavefronts propagating in different directions can be obtained. This is similar to the two different images obtained in stereoscopic viewing. Using these two different wavefronts, depth or height data relating to the object can be attained, in an analogous manner to that by which the eyes can determine depth perception.

Other applications of the preferred methods according to the present invention, of utilizing the best focus position, are now proposed. In order to increase the range of surface topography measurements using a multiple wavelength wavefront determination method, as described hereinabove, prior data about the heights of the different segments in the field of view are often required, in order to overcome imaging noise, which limits the ability of a multi-wavelength measurement solution to overcome the $2\pi$ ambiguity. In accordance with the present invention, the prior data about the heights of the different segments in the field of view can be obtained from "best focusing" of each segment. In a similar manner, the prior data for solving the $2\pi$ ambiguity of interference can be obtained from "best focusing" of each segment in the field of view.

In accordance with further preferred embodiments of the present invention, there are provided apparatus and methods for increasing the range of surface topography measurements. In surface topography measurements, it is required in many cases to measure height over a large range. The range of interferometry methods for height measurements is limited because of the $2\pi$ ambiguity. One of the known methods to increase the height range is to use several different wavelengths to resolve the $2\pi$ ambiguity problem. However, this method is sensitive to noise.

In accordance with this method, the order of the $2\pi$ ambiguity between different pixels in different segments is calculated by combining at least two wavelength reconstructions of phase, using the following algorithm:

A. Unwrapping the phase of the reconstructed wavefront at at least one wavelength (wherein only in regions away from steps is the resulting phase measurement unambiguous).

B. Choosing one anchor point in each segment in the Field of View (FOV hereinafter).
C. Calculating the unambiguous height differences of multiple pairs of points in each segment, one of each pair being the anchor point of that segment, using the phase of the reconstructed wavefront. The height difference can be calculated unambiguously since each of the points in the pairs of points in each segment are close to each other.
D. From the ambiguity order of each pair of points in the two segments, one from each segment, the ambiguity order of the two anchor points of these two segments are derived repeatedly for each pair of points.
E. A histogram of the order of the ambiguity of these pair of anchor points is set and one value for the order is chosen. This value can be the most probable value, the closest to the average or any other statistical derivation from the histogram of the orders of ambiguity.
F. The order value chosen is used again to derive again the ambiguity order of each point with higher accuracy.

This method can be repeated for different pairs of anchor points to increase the accuracy and robustness to noise.

In accordance with another method, the order of the $2\pi$ ambiguity between different pixels in different segments in the FOV is calculated by combining at least two wavelength reconstructions of phase, using the following second algorithm, which mathematically is equivalent to the previous algorithm:
A. Unwrapping the phase of the reconstructed wavefront at at least one wavelength (wherein only in regions away from steps is the resulting phase measurement unambiguous)
B. For any two segments in the FOV S,T, choosing multiple pairs of points ($M_i$, $N_i$), where $M_i$ are points of S, and $N_i$ are points of T, and for each pair of points ($M_i$, $N_i$), combining at least two wavelengths reconstructions to compute the unambiguous difference between the height of the point $M_i$, and the height of the point $N_i$.
C. Adding the unwrapped height (obtained in step A) at point $N_i$ and subtracting the unwrapped height (obtained in step A) at point $M_i$, the ambiguity order of the height difference $\Delta_i$ between the unambiguous height at point $M_i$ and the unwrapped (obtained in step A) height at point $M_i$ is obtained.
D. A histogram of the order of the ambiguity of the differences $\Delta_i$ is set and one value for the order is chosen. This value can be the most probable value, the closest to the average or any other statistical derivation from the histogram of the orders of ambiguity.

In accordance with more preferred methods of the present invention, the order of the $2\pi$ ambiguity between different pixels in the field of view is calculate by combining at least two wavefronts reconstructions, to obtain their phase, at two wavelengths and using the following algorithm:
A. Choosing several reference points and one anchor point in the field of view.
B. Calculating the ambiguity order between each pixel in the field of view and the reference points, using the phase of the reconstructed wavefronts.
C. Using the calculated ambiguity order between each pixel and the reference points, to derive repeatedly the ambiguity order between that certain pixel and the anchor point.
D. Setting a histogram of the order of ambiguity of that certain pixel and choosing the most probable order.

This method can be repeated for different anchor points to increase the accuracy.

When using two or more wavelengths to generate surface topography of an object, two or more single-wavelength reconstructions can be obtained, one per each wavelength. In general, a single wavelength phase function is used to determine the phase of the wavefront where the other wavelength phases functions are combined to resolve the $2\pi$ ambiguity of the phase of this wavelength. However, these two or more resolved single-wavelength reconstructions can be used to generate an improved reconstruction in the following way. In each location in the Field of View, only one of these resolved single-wavelength reconstructions is used to determine the phase of the wavefront, the one that locally has the highest quality. Thus, for different segments, different single-wavelength reconstructions may be used, according to the quality of the data for each wavelength at each segment. The phases at the other wavelengths, which are locally less accurate, are combined to resolve the $2\pi$ ambiguity of the more accurate wavelength's phase. Alternatively, a certain average of all resolved single-wavelength reconstructions is used, where the weights for calculating this average are determined by a quality map of each of the single-wavelength reconstructions, which may be different for different locations in the FOV.

Figure 14:
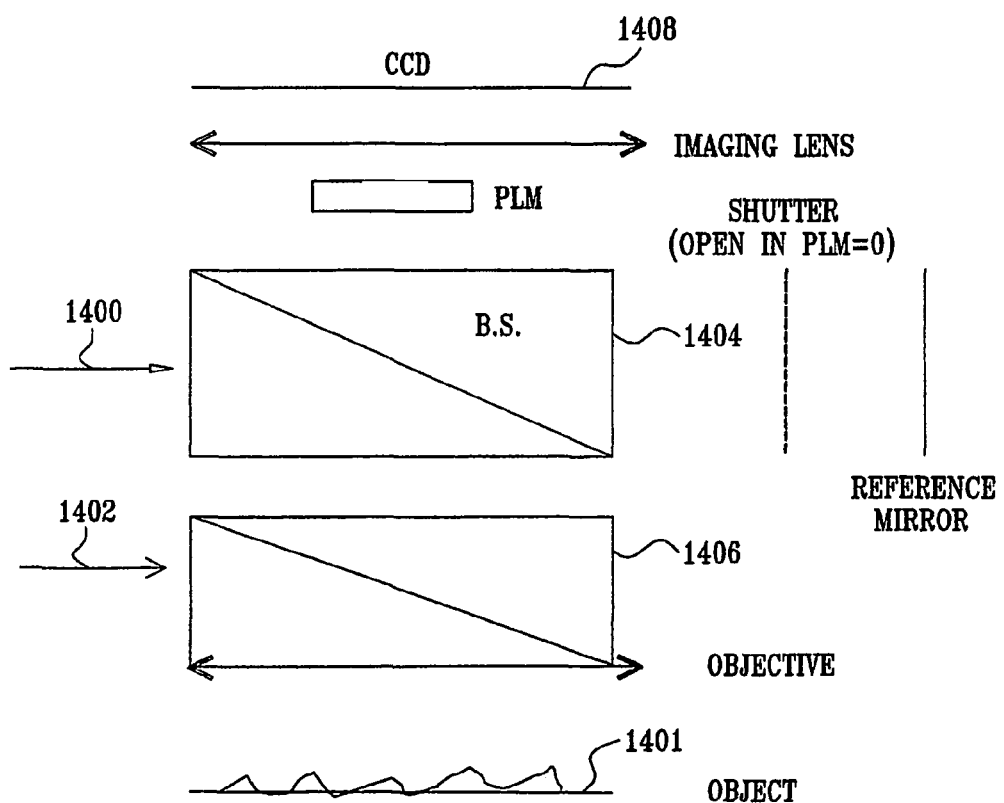
FIG. 14 is a schematic illustration of an interferometry apparatus based on the use of combined white light and coherent light interferometry.

In the "white light interferometry" the fringe pattern can be seen only in heights that have optical path difference relative to a reference mirror, that are less than the light coherence lengths. Thus, when using a white light source together with a coherent light source, the "white light interferometry" fringe pattern can serve as an anchor height for solving the ambiguity for the interferometry with the coherent light-source. As an example, two areas in the FOV which are 1 μm different in height, can be seen as being either 1 μm different or 4 μm different using multiple coherent wavelengths, but using white light, it can be unequivocally determined if these two areas are within 1 μm from each other or not. Alternatively, using white light interference together with coherent light interferometry can provide prior data for the interferometry. Reference is made to FIG. 14, which is a schematic illustration of an interferometry apparatus based on the use of combined white light and coherent light interferometry. The white light 1400 and coherent light 1402 are directed onto the object 1401 by means of beam splitters 1404, 1406, and the reflected light imaged on the CCD 1408.

Using broad-band illumination for wavefront analysis causes errors in height calculations due to the limited coherence length of the broad-band light. In accordance with further preferred embodiments of the present invention, a measurement using broad-band illumination with sufficiently low errors, can be used as a data generator and can provide a-priori data for coherent light sources interferometry.

In accordance with more preferred methods of the present invention, there is provided apparatus and optical elements for improving contrast for wavefront reconstructions. In various contrast methods, such as Zernike Phase-contrast and such as the methods described above and in International Patent Application Publication No. WO 03/062743, the imaging contrast depends on the aperture size and the wavelength, because of the interference between the light passing through the central region of the phase light modulator (PLM) and the peripheral regions, the contrast being determined by the comparative light levels traversing these two regions. The closer the energy levels in the two regions, the higher the image contrast. The longer the wavelength, the larger is the spatial spread of light in the plane of the PLM. Additionally, the smaller the aperture, the larger is the spatial spread of light in the plane of the PLM. Therefore, it is desirable to modify the aperture dimensions as a function of wavelength, in order to obtain the optimal contrast for each wavelength.

Figure 15:
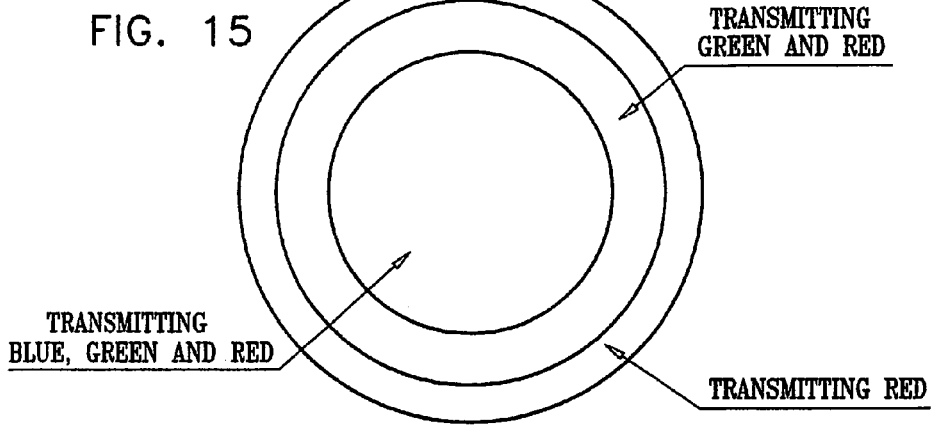
FIG. 15 illustrates schematically how aperture dimensions for different wavelengths can be modified by means of an aperture comprising concentric circles with different transmissivity for different wavelengths, such as by using different spectral filters.

The aperture dimensions for different wavelengths can be modified by means of an aperture comprising concentric circles with different transmissivity for different wavelengths, such as by using different spectral filters, as shown in FIG. 15. Thus, each wavelength or wavelength-range is provided with its own aperture. Such an aperture construction can optimize the contrast for different wavelengths or wavelength ranges, and the spatial dimensions of the aperture scaled according to the wavelength used.

According to another preferred embodiment, instead of using the spectrally sensitive filter as a system aperture, it can be placed close to the PLM in order to vary the transmissivity of the peripheral part of the PLM in comparison with the central part. When the transmissivity of this area is reduced the contrast can be enhanced. This enables enhancing the contrast differently for each wavelength. If the contrast is low, adjustment of the PLM spatial spectral transmission function can be used to improve the contrast, and especially the relative spectral transmission of the central region and the peripheral region of the PLM.

In accordance with more preferred methods of the present invention, there is provided a method of adding a polarizer and a second rotating polarizer to the optical system, before and after the phase manipulator, where the phase manipulator consists of birefringent material, in order to control and optimize the contrast obtained in the image plane in various Microscopy spatial-filtering methods. The phase manipulator has a plurality of different spatial parts. At each part a different optical path difference for the two polarizations of light can be selected according to the control signals applied to each part. The polarization state of the polarizers and the optical path difference at each part, effect the transmissivity and the phase delay of the light. Thus, changing the optical path difference and rotating the second polarizer can control the transmissivity and the phase delay of light at each spatial part of the phase manipulator.

In one preferred embodiment, the phase manipulator has two spatial parts and the optical axis of the birefringent material is positioned at 45° to the first polarizer's axis. If the first polarizer's axis is parallel to the X axis, the transmissivity $\tau$ of each spatial part of the phase manipulator is given by:

$$\tau_i + \frac{1}{2}[1 + \cos(\theta_i)\cos(2\alpha)] \quad (1)$$

where $\theta_i$—the phase delay generated by the phase manipulator between the two polarizations at a certain spatial position, i.

$\alpha$—the angle of the rotating polarizer relative to the X axis (the first polarizer's axis).

The phase delay of light after passing the rotating polarizer at each part of the phase manipulator, is given by:

$$\tan(\theta'_i) = \frac{\cos(\alpha - 45)\sin(\theta_i)}{\cos(\alpha - 45)\cos(\theta_i) - \sin(\alpha - 45)} \quad (2)$$

The phase delay difference between the two spatial parts of the phase manipulator, is:

$$\Delta\theta = \theta_1' - \theta_2' \quad (3)$$

where the phase delay difference is utilized in order to obtain a plurality of different phase changed wavefronts for use in wavefront analysis.

For any required transmissivity ratio $$\frac{\tau_1}{\tau_2},$$

there are 4 different solutions for $\Delta\theta$, where different values of $\alpha$ may also be needed. Consequently, these four solutions can be used for obtaining four different images, required in order to provide a complete wavefront determination, as described in the background section of this application. Conversely, if the second polarizer is kept fixed, i.e for fixed $\alpha$, and a phase difference applied by adjustment of the phase delay in various spatial parts of the PLM to obtain the required transmission ratio, there are 2 solutions for $\theta$, and hence 4 solutions for $\theta'$, and hence at least four solutions for $\Delta\theta$. Consequently, these four solutions can be used for obtaining four different images required in order to provide a complete wavefront determination, as described in the background section of this application.

In accordance with the present invention, one can find 4 different phase delays between the two parts of the phase manipulator for any given transmissivity ratio $$\frac{\tau_1}{\tau_2},$$

by using a constant phase manipulator. In a preferred embodiment, the constant phase manipulator consists of a birefringent material, with one polarizer before it and the rotating polarizer after it. The optical axis of the birefringent material of the phase manipulator is positioned at 45° to the first polarizer. One part of the phase manipulator acts as a $$\frac{\lambda}{4}-$$

wave-plate, and the other part as a $\lambda$-wave-plate. In this case, the transmissivity of the $$\frac{\lambda}{4}-$$

wave-plate part of the phase manipulator is always 0.5. The transmissivity in the $\lambda$-plate part of the phase manipulator can be controlled by the rotation of the second polarizer, and is given by:

$$\tau = \frac{1}{2}[1 + \cos(2\alpha)] \quad (4)$$

The phase delay in the $\lambda$-plate part of the phase manipulator is always zero, but the phase delay in the $$\frac{\lambda}{4}-$$

plate part of the phase manipulator is given by:

$$\tan(\vartheta') = \frac{\cos(\alpha - 45)}{-\sin(\alpha - 45)} = -\cot ag(\alpha - 45) \quad (5)$$

Using equation (5), one can find four different phase delays between the two parts of the phase manipulator for any given transmissivities ratio $$\frac{\tau_1}{\tau_2}.$$

In accordance with more preferred methods of the present invention, there are provided apparatus and algorithms in a number of different embodiments, for improving the image quality for wavefront reconstructions, by reducing noise introduced as a result of the coherent illumination of the object. According to a first such embodiment, comparing or combining the phase and amplitude components of different measured propagating wavefronts in different planes, can correct the wavefront measurements and reduce noise, since the differences between them should be a result of noise only and not of true data. According to this method, noise reduction can be achieved by taking one measurement at a focal plane, including full wavefront reconstruction, and another measurement, also including full wavefront reconstruction, at a plane where the image is defocused by a known amount by the system hardware. The defocused wavefront is then re-focused by propagation software, by the known amount of applied defocusing, as explained in the method hereinabove, thus generating a second in-focus wavefront, and the combining of these two wavefronts by means of averaging, comparing, or any other known image processing function, can be used to reduce noise.

According to a further embodiment of the present invention, a noisy wavefront, in which the noise results from a local disturbance at a different plane, such as from dust or a defect in the optical path, is propagated to the plane in which the disturbance is local, i.e. the disturbance is in-focus. In that plane, the disturbance can then be eliminated, such as by an interpolation or averaging of the neighboring areas or by any other method. The modified wavefront is then back-propagated to the original plane, or to any other defined plane in order to generate a non-disturbed wavefront. The same method can be used to correct image aberrations,—the wavefront can be propagated to a plane in which the source of the aberration is situated, and has a known form, and there the aberration is eliminated and the wavefront propagated back to generate an aberration-free wavefront.

Figure 16:
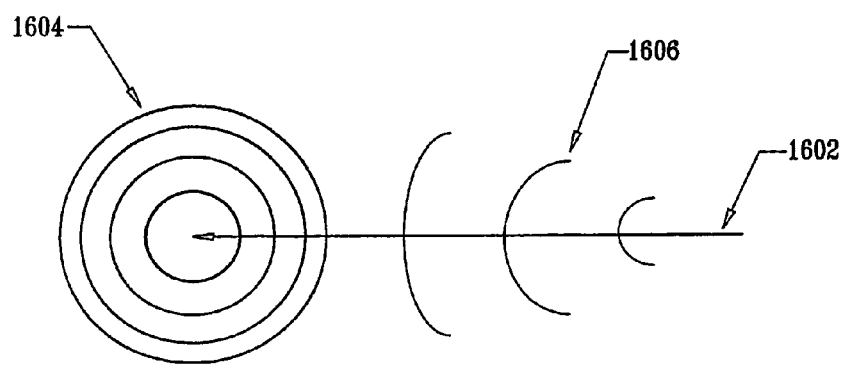
FIG. 16 illustrates schematically a preferred method of implementing a method of reducing the effects of a disturbance in a wavefront, such as arising from dust or a defect in the optical path.

Reference is now made to FIG. 16, which illustrates schematically a preferred method of implementing this method of reducing the effects of a disturbance in a wavefront, such as arising from dust or a defect in the optical path, by direct calculation of the position of the source of the disturbance, i.e. the plane where the disturbance is in-focus, using the frequency and position of circular fringes of the disturbance. This positional knowledge can be used to eliminate the disturbance such as by adding a virtual disturbance source in the same location that cancels the source of the true disturbance. The disturbance can be any point-source disturbance or any other type of disturbance, such as generated by optical components. FIG. 16 shows the position 1602 of the source of the disturbance, and its emanating wavefront 1606, and the resulting fringe pattern 1604.

Further preferred methods of the present invention can be used to reduce noise in imaging, especially in coherent imaging, and in the results of the wavefront analysis methods described above, by acquiring a number of images of an object to be inspected, through movement of any element in the optical imaging path. This movement can be either one or a combination of the movements described below:

I. Movements of the object-illumination light source in all three axis, and corresponding movement of the PLM in the optical path to maintain it in the image plane of the moving light source, thus compensating for the light source movements, where the images are integrated in the time domain.
II. Movement of the PLM used within the optical path to generate multiple phase-changed transformed wavefronts.
III. Movement of the object along the Z-axis to different focused and defocused states.
IV. Movement of the object in different positions off-axis or different tilt and image registration.
V. Movement of any optical component in the optical path.

According to these methods, compensation for the movements and averaging of the multiple images is performed to reduce the effects of noise, since the image information is additive, and the noise is spatially different for each movement position, and is therefore averaged out. The compensation can be accomplished by registration of these multiple images and averaging of these registered images. Alternatively and preferably, the movements are compensated for by means of hardware and averaging the multiple images. Alternatively, the movements can preferably be compensated for by means of software such as wavefront propagation and manipulation. These registrations, compensations and averaging can be performed either on the image intensities, or on the measurement results arising from the reconstructions of the object.

Figure 17:
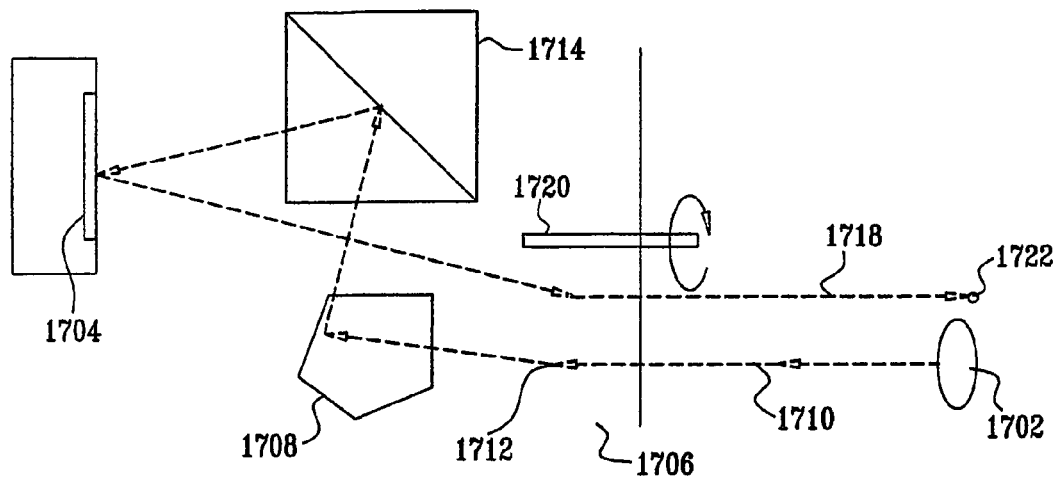
FIG. 17 illustrates a preferred apparatus for implementing a method of moving the optical in an imaging system, without mechanical movement of any of the elements of the imaging system themselves.

Reference is now made to FIG. 17, which illustrates a preferred apparatus, constructed and operative according to another preferred embodiment of the present invention, for implementing a method of changing the optical path between the illumination source 1702 and the specific point 1722 on the PLM on which the beam impinges, without mechanical movement of any of the elements of the imaging system themselves. During its path through the system, the collimated beam that illuminates the object is steered in a manner such that it always impinges on the PLM at the same spot 1722. The beam is made to pass through the imaging system between the light source and the PLM, shown schematically as 1704 in FIG. 17, along different optical paths. The collimated beam that illuminates the object is steered while illuminating the object, and in its return path, it is steered back to a path parallel to its incident path. In FIG. 17, a rotating wedge 1706 is used to generate the motion of the beam. The wedge preferably rotates about an axis 1720 parallel to the optical axis of the illuminating system. Rotation of the wedge 1706 causes the input illuminating beam 1710, whose path is shown as a dashed line, to generate a path which wobbles at its output point 1712 from the rotating wedge, describing a circularly directed path as the wedge is rotated, the direction of propagation from the output point being cyclically dependent on the rotational position of the wedge. In FIG. 17, the path is shown for only one position of the rotating wedge. In the preferred embodiment of FIG. 17, the wobbled beam is directed into a roof-penta prism 1708 and the beam reflected from there, is further reflected in a beam splitter 1714 towards the imaging section of the system 1704, and then to the PLM 1722. The penta-prism 1708, which is used to create an odd number of reflections in both X- and Y-directions, in combination with the reflection in the beam splitter 1714, results in an even number of reflections, thus generating a retroreflection effect, and the returned beam is always parallel to the incident beam. Any beam which enters the wedge at a given angle, returns after transit through the entire optical path at that same angle. Therefore, the imaging relationship between the source and the impingement point on the PLM is unchanged, even though the optical path between them undergoes spatial motion as the wedge is rotated.

In accordance with further preferred embodiments of the present invention, a method is provided of reducing coherent noise in an imaging system by comparing or combining the calculated and the measured intensity of the Fourier transform of an imaged object, in order to correct the measurements and thereby reduce noise. One preferred way of doing this can preferably comprise the steps of (i) performing a measurement at the image plane, including full wavefront reconstruction, of an object and calculating the Fourier Transform of the wavefront, (ii) acquiring the real intensity image of the Fourier plane of the imaging system that images the object, by imaging the Fourier plane directly, (iii) combining or averaging or treating by image processing the intensity of the calculated Fourier Transform obtained from the reconstructed wavefront with the real intensity image obtained in the Fourier plane, while leaving unchanged the original phase of the calculated Fourier transform, and (iv) performing an inverse Fourier Transform using the same phase function, to generate a modified wavefront reconstruction with minimized noise.

Additionally, the coherent noises in the imaging system can preferably be reduced by using a combination of light sources such as a wideband light source and coherent light sources. The wideband light source is used to achieve a smooth image, to define the different segments in the field of view and to determine preliminary calculated segment heights to within the limitations of the phase ambiguity, although the calculated height is not exact due to the limited coherence length of the white light. These preliminary calculated heights serve as an initial input for the phase obtained by the coherent light source to determine the correct heights of each segment, as will be determined accurately using the coherent source.

In accordance with another preferred method of the present invention, coherent noises in imaging systems can be reduced by using two or more wavelengths to generate surface topography of an object and two or more single-wavelength reconstructions can be obtained, one per wavelength. In general, a single wavelength phase function is used to determine the phase of the wavefront where the other wavelength phases functions are combined to resolve the $2\pi$ ambiguity of this wavelength's phase. However, these two or more resolved single-wavelength reconstructions can be used to generate an improved reconstruction in the following way. In each location in the Field of View, the different single-wavelength reconstructions are compared, and when one or more resolved single-wavelength reconstructions gives a smooth pattern at a certain location, the other patterns of the other single-wavelength reconstructions are smoothed in the same manner. The smoothing can be also influenced by a more sophisticated weighting algorithm, such as weighting by means of a quality map of the smooth single-wavelength reconstructions.

In accordance with a further preferred embodiment of the present invention, coherent noises in an imaging system may be reduced by using combination and averaging of two images obtained by two different polarizations of light.

Figure 18:
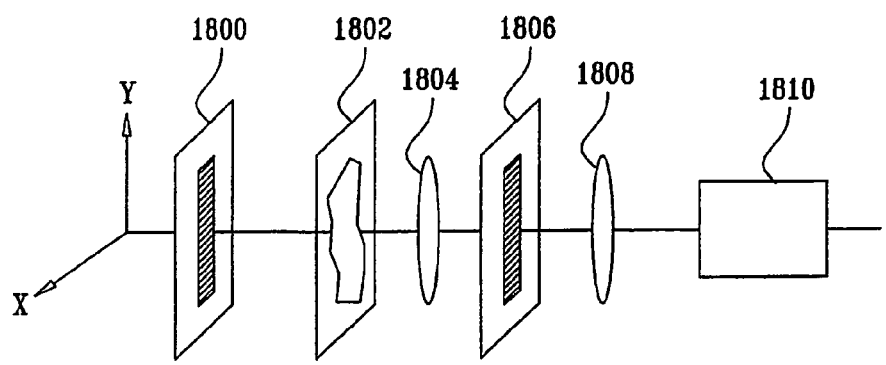
FIG. 18 illustrates a coherent imaging system using a line source to reduce the spatial coherence of light in order to increase the lateral resolution; in the configuration described of FIG. 18, the spatial coherence in the Y direction is eliminated.

An imaging system working with spatially coherent light may be noisy due to fringes arising from many sources, especially interference patterns between different layers in the optical path. It is desirable to reduce the spatial coherence of light in order to eliminate the fringes and to increase the lateral resolution. However, in order to obtain a plurality of intensity maps out of the plurality of phase changed transformed wavefronts, spatial coherence over the wavefront to which spatial phase change is applied, is preferred. According to this preferred method, a light source having spatial coherence in one-dimension only is preferably used. This can be accomplished by using, for instance, instead of a point light source, a line light source. This line-light source can be used to reflect light from an inspected object or transmit light through a partially transparent inspected object. Additionally, the spatial function of the phase change applied at each spatial location of the transformed wavefront (designated 'G' hereinabove) is preferably a line-function, generating a spatially uniform spatial phase delay in a region having a line-like, elongated shape of relatively small width, passing through the central region of the transformed wavefront. This line spatial function in conjunction with the line light source, reduce the computation algorithms to be very similar to those described above. This line phase delay can be introduced, for instance, by a filter in the Fourier plane, as shown in FIG. 18. In the preferred embodiment of FIG. 18, the light is projected from a line source 1800, through the object 1802. The resulting waveform is focused by a lens 1804 onto a line phase manipulator 1806, preferably located at the focal plane of lens 1802. A second lens 1808 is arranged so as to image the wavefront onto the detector 1810.

In the configuration described above in FIG. 18, the spatial coherence in the Y direction is eliminated. In the image plane, as obtained on the surface of the camera in the preferred embodiment of FIG. 18, the convolution of the object and the Fourier transform of the filter is obtained only for one dimension (X) and not for the other dimension (Y). Accordingly, the calculations required for measurement of the inspected object, namely obtaining the phase and amplitude of the wavefront being analyzed, need to be performed only in one dimension and not in both dimensions. In addition the measurement and analysis system is much less sensitive to tilt of the inspected object in the Y axis, whether the measurement is performed by reflection or transmission. The inspected object can subsequently be rotated to decrease the tilt sensitivity in the other dimension. It should be clear that a line is only one example of a preferred shape of the light source, and any shape other than a point source affects the coherence, and can thus can be used. By using combinations of two images when for each time the spatial coherence of light is destroyed in one dimension in turn, the inspected object can be reconstructed in the two dimensions, independently. These two reconstructions can be combined to reconstruct the third dimension of a 2-D image of the object.

The two one-dimensional reconstructions are preferably obtained by rotating the light source and the phase plate in the Fourier plane in the same manner. Alternatively, the two one-dimensional reconstructions are obtained by using two different polarizations of light Each polarization has its own 1-dimensional light source and one dimensional phase plate in the Fourier plane. A rotating polarizer preferably transmits one intensity image at a time to the camera. More preferably, the light source may consist of two crossed 1-Dimensional light sources (line light sources), each having a different polarization. The phase plate in the Fourier plane consists of birefringent material with a cross pattern, one line in the cross performing a suitable phase shift to only one polarization and the other orthogonal line in the cross performing a suitable phase shift to the other polarization. A rotating polarizer preferably transmits one intensity image at a time to the camera.

In many applications it is desired to measure small features that are just resolved by an optical system, or are even much smaller than minimum size that can be resolved by the optical system. The required accuracy of the measurement may need to be several orders better then the resolving power of an optical system in which the feature already looks blurred or cannot even be seen by conventional imaging. Reference is now made to FIG. 19, which is an illustration of an image of an integrated optics waveguide structure taken with a microscope having a ×50 objective. It is required to measure to an accuracy of 0.05μ, the width of features or spacings between the waveguides, using an optical system having a resolving power of 0.5μ.

Reference is now made to FIG. 20, which shows an enlarged portion of the image of FIG. 19, as indicated by the marked section of the image of FIG. 19, illustrating how the details of the edges in the image are blurred due to the limited resolving power of the microscope. When the image of the target to be measured is taken at different defocused positions, the blur of the image is changed according to the level of defocusing.

Figure 21:
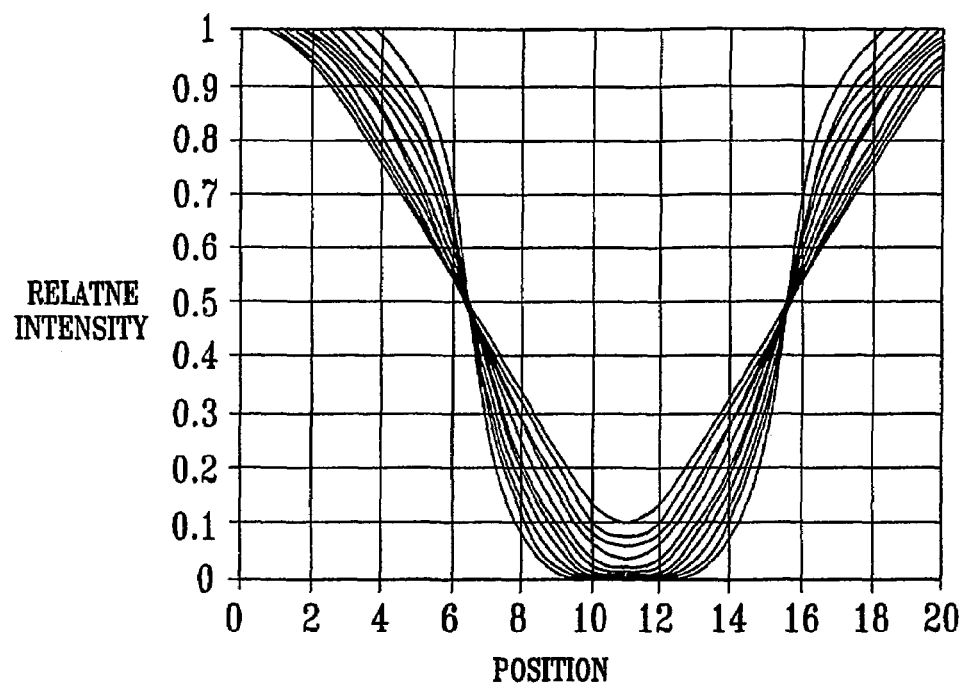
FIG. 21 is a graph showing curves of the cross-section of the illumination across the edges of a structure in the image of FIG. 20, for different defocusing levels.

Reference is now made to FIG. 21, which is a graph showing curves of the cross-section of the illumination across the edges of the waveguide in the image of the device, for different defocusing levels. As can be seen, all of the cross sections pass through the same height position, where the width indicated is the true width of the dark lines.

According to this method, several images of the target to be measured are preferably taken at different defocus positions and cross-sections of the illumination across edges of different features in the image are plotted. An accurate measurement of the edge and the spacing between different features can be obtained by finding the point at which the illumination plots all converge at a stationary point in the function of the intensity as a function of lateral position, for different focusing positions. The illumination light source can have any degree of coherence. A higher accuracy of determining the true widths of the lines can be obtained when the narrow lines are positioned in a rotational angle with respect to the imaging sensor primary axis. This is indicated in FIG. 19 and FIG. 20 by the diagonal narrow line with respect to the axis of the imaging sensor across the X and Y-axis.

According to another preferred embodiment of the present invention, several measurements of a target to be measured are taken using a wavefront analysis system at different defocus positions. Cross-sections of the intensity or the phase or both, across edges of different features in the image, are plotted. An accurate measurement of the edge and of the spacing between different features can be obtained by finding the half height point of these plots.

Figure 22:
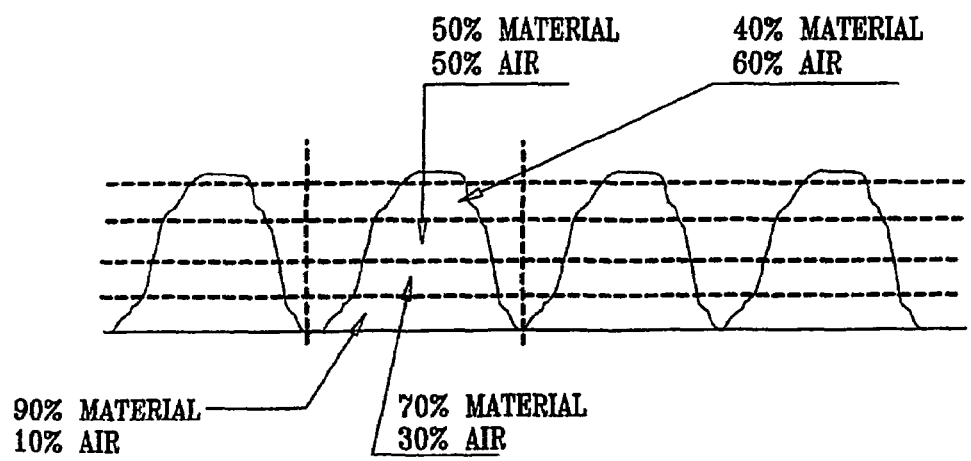
FIG. 22 illustrates schematically the cross section of a periodic sub-wavelength structure, whose details are to be resolved and characterized by means of a further preferred embodiment of the present invention.

Reference is now made to FIG. 22, which illustrates schematically the cross section of a periodic sub-wavelength structure, whose details are to be resolved and characterized by means of a further preferred embodiment of the present invention. According to the methods of this embodiment, Spectroscopic Ellipsometry is used to perform such sub-wavelength measurements. The periodical structure is sliced mathematically into several virtual layers. Each layer has different averaged optical parameters, n and k, due to the different percentage of different materials composing that slice. In the preferred example of FIG. 22, the materials are air and another material making up the structure itself. If the sliced periodical sub-wavelength structure is considered as a regular multilayer stack, the averaged optical parameters, n and k, of each slice can be obtained by means of Spectroscopic Ellipsometry and associated algorithms. Accordingly, the different percentage of the different materials at each slice of the feature can be obtained. These calculated percentages can be compared to the expected percentages of the different materials at that slice, according to the designed structures. Any deviation from the expected percentages of the different materials at each slice can be interpreted as deviation of the fabricated structure from the intended structure.

Alternatively and preferably, the measured averaged optical parameters, n and k, of each slice are compared to the expected averaged optical parameters n and k. Any deviation can be interpreted as a deviation of the fabricated structure from the designed structure. Alternatively, the measured averaged optical parameters, n and k, of each slice are preferably compared to data concerning n and k stored in a bank of many simulated periodical sub-wavelength structures. Any deviation from the stored data can be interpreted as deviation of the fabricated feature from the simulated structures.

In accordance with another preferred method of the present invention, the periodical sub-wavelength structure is measured by means of Spectroscopic Ellipsometry using a wavefront analysis system of the present invention, as described above. Additionally, in such a case, each pixel at the image wavefront can be considered to correspond to a different periodical sub-wavelength structure. The Spectroscopic Ellipsometry algorithm described above is then applied to each pixel of the image, independently.

In the semiconductor integrated circuit (IC) industry, there is a growing demand for higher circuit packing densities. This demand has led to the development of new materials and processes to achieve increased packing densities and sub-micron device dimensions. Manufacturing IC's at such minute dimensions adds more complexity to circuits and increases the demand for improved methods to inspect integrated circuits in various stages of their manufacture. An IC is constructed of many layers that create the devices and the conductors of the circuit. Overlay is a misregistration between the layers generated during the lithography process, and overlay measurements are used for monitoring the lithography process.

There are now described preferred methods to perform improved overlay measurements, based on the use of methods of utilizing using phase data for thin film alignment and measurement. The methods have several potential usages and advantages over existing methods, for overlay-targets measurements. By propagating the measured wavefront's complex amplitude from the top surface of an overlay material to any other desired plane, as per the methods of the present invention, a focused image of different layers can be obtained. These images of different planes are derived by software manipulation of one single wavefront, preferably obtained in a single imaging procedure and in a short time frame, and are therefore not subject to noise or mechanical disturbances resulting from multiple images taken at different focusing levels to image the different layers. Different images in different layers can then be measured, compared or aligned relative to each other.

Another preferred method is used for contrast enhancement. Some overlay targets are difficult to view using conventional bright-field imaging schemes. These targets include overlay targets after Chemical-Mechanical Polishing (CMP), or targets consisting of a very thin layer, such as only a few nanometers. The contrast enhancement enabled by the methods of the present invention allow better discrimination in such targets, since low contrast due to phase differences between the imaged layers, can be enhanced. Furthermore, the method enables distinction of very thin layers, typically down to less than 10 nm.

Another preferred method utilizes 3D information, which can provide additional real information about the complete topography of the inspected target, to improve data analysis and misregistration calculations. The 3D data can indicate asymmetric phenomena of the process, such as tilt of the box layer or different slopes of the box edges. Information about tilt of a layer, at the microscopic level, can be used for stepper feedback or for controlling any chemical/tool process. If the tilt phenomenon is macroscopic, then simple tilt cancellation by means of software can improve the accuracy and repeatability of the misregistration calculation.

The methods of the present invention, as a phase analysis tool, allow reconstruction of the height map of the FOV with a relatively large depth of focus, since a layer which may be out of focus in the intensity image, may be better focussed in the phase regime. This feature permits the detection of several layers in a single grab, i.e. without the need of successive focusing on the separate layers. Such multiple focus imaging is known as "double grab", and this prior art procedure is prone to errors, such as misalignment of images as a result of mechanical movement. Furthermore, the additional time required for each imaging step is avoided, and the throughput thus improved.

The 3D information can be obtained even at small defocus. This means that the effective depth of focus for the 3D measurement is larger than the depth of focus of a conventional 2D system using the same optics.

By propagating the reconstructed wavefront's complex amplitude by known formulas from one plane to any other desired plane, an extended 3D and object's surface mapping range is obtained without the need of more scanning.

There is no need for focusing the measuring device onto the targets to be measured. The measured wavefront's complex amplitude at one plane can be propagated from the measuring plane to any other desired plane to obtain a focused target's image.

By propagating the measured wavefront's complex amplitude from the measuring plane to any other desired plane to obtain a focused target's image, the absolute distance between these two planes can be calculated.

By propagating the measured wavefront's complex amplitude from the measuring plane to any other desired plane to obtain a focused image, a focused target's image of large depth of focus can be obtained.

In accordance with the present invention, a 3D sensor can be added to an existing 2D overlay inspection system.

The 3D sensor added to the existing 2D provides 3D information that can be utilized to find an optimal focus for the measurement in 2-D.

The 3D sensor used as a focus system can deal with semi-transparent layers as well, especially if there is an prior knowledge of the index of refraction and the nominal thickness of such dielectric layer.

The 3D information can also provide data that may predict Tool Induced Shift (TIS) problem and permits data analysis and focus correction accordingly.

Using 3D information in conjunction with the 2D measurement for better analysis of the misregistration in the same idea of "majority vote" for pass/fail (or any 0/1) decision.

Since the 3D sensor requires a single wavelength (or narrow bandwidth) an optical system with better performance with elimination of chromatic aberrations can be designed.

The images of the targets are taken with different defocus positions. The position of each target can be determined with better accuracy using the method of finding widths of lines in high resolution using various focusing positions and finding the cross-points of the profiles as described above.

The methods and implementations described above were sometimes described without relating to specific details or components of the implementations. Some of the possible ways to broaden the method and apparatus, along with some of the possible details of the method and possible components of the devices implementing the method are mentioned in PCT Application No. PCT/IL/01/00335, in U.S. Pat. No. 6,819,435, and in PCT Application No. PCT/IL02/00833.

It should be noted that when a specific example or specific numerical details are given they are only intended to explain one possible implementation of the method, and the invented method is not limited by them.

It should be noted that the details and specifics in this document detailing the invented methods and devices, including any combination of theses features, are only a few examples of possible systems and implementations of the invented methods, and the invented methods are not limited by them.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

We claim:

1. A method for obtaining a focused image of an object comprising the steps of:
    illuminating said object;
    obtaining amplitude and phase information of a wavefront of said illumination emanating from said object, in an arbitrary plane at which said wavefront does not necessarily generate a focused image; and
    using processing circuitry:
        calculating by means of mathematical solutions of the propagation properties of said wavefront, the form of the wavefront at a series of additional planes down the propagation path of said wavefront; and
        determining at which of said additional planes said wavefront has the form of a focused image.

2. The method according to claim 1, and wherein said step of determining at Which of said additional planes said wavefront has the form of a focused image comprises:
    calculating at each of said additional planes, the entropy of the complex function of at least one optical characteristic of the wavefront, wherein said entropy is determined from a measure of the cumulative surface area of said complex function of the wavefront; and
    determining the propagation step at which said entropy is at a minimum.

3. The method of claim 2 wherein said complex function of the wavefront is at least one of a complex amplitude function, a complex phase function and a complex amplitude and phase function.

4. A method according to claim 1, wherein said object is a multilayered structure having a first layer and a second layer;
    wherein the step of obtaining amplitude and phase information of a wavefront in an arbitrary plane comprises obtaining amplitude and phase information of a first complex wavefront map representing the image of a plane in said first layer; and
    wherein the step of calculating by means of mathematical solutions of the propagation properties of said wavefront, the form of the wavefront at a series of additional planes comprises calculating amplitude and phase information of a second complex wavefront map representing the image of a plane in said second layer;
    said method further comprising the step of comparing said first and said second complex wavefront maps to provide information about the overlay of said first and second layers.

5. The method of claim 4 wherein said information about the overlay of said first and second layers is provided in a single imaging process, without the need for imaging system refocusing.

6. The method of claim 4 wherein use of said amplitude and phase information enables increased contrast measurements to be made in comparison to imaging methods which do not use phase information.

7. The method of claim 4 wherein use of said amplitude and phase information enables three dimensional information to be obtained about said multilayered structure, thereby improving misregistration measurements in comparison to imaging methods which do not use phase information.

8. The method of claim 4 wherein use of said phase information enables an increased depth of focus measurement to be made in comparison to imaging methods which do not use phase information, thereby enabling imaging of more than one layer in a single imaging process.

9. A method according to claim 1, wherein said object has a first and a second segment having a height difference between them;
wherein it is determined at which of said additional planes said wavefront has the form of a focused image of said first segment; and wherein it is determined at which of said additional planes said wavefront has the form of a focused image of said second segment;
said method further comprising the step of obtaining said height difference by subtracting the distance between said additional plane where said wavefront has the form of a focused image of said second segment, and said additional plane where said wavefront has the form of a focused image of said first segment.

10. A method according to claim 9, wherein the steps of determining at which of said additional planes said wavefront has the form of a focused image of said first segment and at which of said additional planes said wavefront has the form of a focused image of said second segment is applied to each segment independently.

11. A method according to claim 10, wherein the steps of determining at which of said additional planes said wavefront has the form of a focused image of said first segment and at which of said additional planes said wavefront has the form of a focused image of said second segment is done by applying a minimal entropy algorithm for each segment.

12. A method according to claim 11, wherein applying a minimal entropy algorithm for each segment comprises calculating for each segment the cumulative surface area of the complex amplitude function modulus of the wavefront.

13. A method according to claim 9, where said height difference between said two segments is utilized as an estimated height difference to reduce phase ambiguity arising in other measurement methods.

14. A method according to claim 13, where other measurement methods comprise a multiple wavelength wavefront determination method.

15. A method according to claim 1, wherein at said arbitrary plane the wavefront generates a defocused image, and wherein during the step of determining, focused amplitude and phase wavefront information is obtained in one of said additional planes, said plane being distant from said arbitrary plane by a refocusing distance, the method further comprising the steps of:
refocusing said defocused image by said refocusing distance;
obtaining refocused amplitude and phase information of said wavefront of illumination emanating from said object in said plane being distant from said arbitrary plane by a refocusing distance;
and combining said refocused amplitude and phase waveform information and said focused amplitude and phase waveform information to reduce coherence noise in said imaged object.

16. The method of claim 15, Wherein said step of combining is performed by at least one of averaging, comparing, and image processing.

17. A method according to claim 1, wherein said wavefront at said arbitrary plane exhibits noise arising from a disturbance located at a second plane; and
wherein it is determined at which of said additional planes said wavefront is such that an image containing said disturbance is optimally focused;
said method further comprising the steps of:
modifying said wavefront at said optimally focused location such that said disturbance is cancelled; and
using said modified waveform, calculating by means of mathematical solutions of the propagation properties of said wavefront, new amplitude and phase waveform information at said arbitrary plane, from which an image can be obtained without noise arising from said local disturbance.

18. A method according to claim 17, wherein said disturbance appears as concentric fringes from a dust particle not in focus.

19. The method of claim 17, wherein said disturbance is cancelled by image processing.

20. The method of claim 17, wherein said disturbance arises from dust or a defect in the propagation path of said wavefront.

21. A method according to claim 1, wherein said wavefront at said arbitrary plane exhibits an aberration in an optical system containing said object;
said method further comprising the steps of:
determining at which of said additional planes said wavefront has such form that the source of said aberration is situated;
modifying said wavefront at said aberration source location such that said aberration is eliminated; and
using said modified waveform, calculating by means of mathematical solutions of the propagation properties of said wavefront, new amplitude and phase waveform information at another plane, from Which an aberration-free image can be obtained.

22. The method of claim 1, further comprising constructing an image based on the form of the wavefront at one of said additional planes using the processing circuitry.

* * * * *

UNITED STATES PATENT AND TRADEMARK OFFICE
CERTIFICATE OF CORRECTION

PATENT NO. : 8,319,975 B2
APPLICATION NO. : 10/592544
DATED : November 27, 2012
INVENTOR(S) : Yoel Arieli et al.

It is certified that error appears in the above-identified patent and that said Letters Patent is hereby corrected as shown below:

Title page (73) Assignee: replace "Nano-Or Technologies (Israel) Ltd., Lod (IL)" with "Icos Vision Systems NV, Heverlee (BE)."

Signed and Sealed this
Fourteenth Day of May, 2013

Teresa Stanek Rea
*Acting Director of the United States Patent and Trademark Office*